US012092891B2

(12) United States Patent
Avivi et al.

(10) Patent No.: US 12,092,891 B2
(45) Date of Patent: Sep. 17, 2024

(54) OPTO-MECHANICAL UNIT HAVING A TUNABLE FILTER HOLDER AND A TUNABLE FILTER

(71) Applicant: Unispectral Ltd., Ramat Gan (IL)

(72) Inventors: Gal Avivi, Haifa (IL); Nadav Osiroff, Tel-Aviv (IL); Peleg Levin, Rishon Le-Zion (IL)

(73) Assignee: Unispecral Ltd., Ramat Gan (IL)

( * ) Notice: Subject to any disclaimer, the term of this patent is extended or adjusted under 35 U.S.C. 154(b) by 1028 days.

(21) Appl. No.: 16/975,513

(22) PCT Filed: Feb. 25, 2019

(86) PCT No.: PCT/IB2019/051487
§ 371 (c)(1),
(2) Date: Aug. 25, 2020

(87) PCT Pub. No.: WO2019/162909
PCT Pub. Date: Aug. 29, 2019

(65) Prior Publication Data
US 2021/0033814 A1    Feb. 4, 2021

Related U.S. Application Data

(60) Provisional application No. 62/634,996, filed on Feb. 26, 2018.

(51) Int. Cl.
G02B 7/00     (2021.01)
G02B 5/20     (2006.01)
H04N 23/55    (2023.01)

(52) U.S. Cl.
CPC .............. *G02B 7/006* (2013.01); *G02B 5/20* (2013.01); *G02B 7/008* (2013.01); *H04N 23/55* (2023.01)

(58) Field of Classification Search
CPC ........ G02B 26/001; G02B 5/20; G02B 7/006; G02B 7/008; G02B 7/025; H04N 23/55
See application file for complete search history.

(56) References Cited

U.S. PATENT DOCUMENTS

| 4,390,242 A | 6/1983 | Tatsumi |
| 10,113,909 B2 * | 10/2018 | Hirokubo ................. G01J 3/12 |
| 2004/0263276 A1 * | 12/2004 | Byrne ..................... H01F 21/00 |
| | | 333/181 |
| 2006/0028573 A1 | 2/2006 | Seo et al. |
| 2006/0171704 A1 | 8/2006 | Bingle et al. |

(Continued)

FOREIGN PATENT DOCUMENTS

| CN | 101630214 A * | 1/2010 | .............. G02B 5/20 |
| CN | 104580856 A | 4/2015 | |

(Continued)

*Primary Examiner* — Collin X Beatty
(74) *Attorney, Agent, or Firm* — Whitestone Law, PLLC

(57) ABSTRACT

An opto-mechanical unit that comprises a tunable filter, a holder that surrounds the tunable filter, and mechanically-damping and gluing gel; wherein the holder is spaced apart from the tunable filter; wherein the mechanically-damping and gluing gel surrounds the tunable filter and is attached to the holder and to the tunable filter; and wherein the holder comprises a camera interface that (a) defines a first inner space, and (b) introduces a gap between the tunable filter and the camera interface.

18 Claims, 23 Drawing Sheets

(56) References Cited

U.S. PATENT DOCUMENTS

| | | | |
|---|---|---|---|
| 2006/0279732 A1* | 12/2006 | Wang | G01N 21/718 |
| | | | 356/326 |
| 2008/0079846 A1* | 4/2008 | Ikari | H04N 23/57 |
| | | | 348/E5.026 |
| 2008/0297925 A1* | 12/2008 | Chen | H04N 23/57 |
| | | | 348/E5.022 |
| 2008/0297933 A1* | 12/2008 | Hsu | H04N 9/3114 |
| | | | 359/891 |
| 2012/0268642 A1 | 10/2012 | Kawai | |
| 2013/0135488 A1 | 5/2013 | Yokota et al. | |
| 2015/0029590 A1 | 1/2015 | Hirokubo | |
| 2015/0062708 A1* | 3/2015 | Matsuno | G02B 26/001 |
| | | | 359/578 |
| 2016/0241797 A1 | 8/2016 | Ye | |
| 2016/0295133 A1 | 10/2016 | Rudmann et al. | |
| 2016/0316117 A1 | 10/2016 | Singh et al. | |
| 2017/0160509 A1 | 6/2017 | Wang et al. | |
| 2017/0199372 A1 | 7/2017 | Arakawa et al. | |
| 2017/0280027 A1 | 9/2017 | Wang et al. | |
| 2019/0155015 A1* | 5/2019 | Sano | G01J 3/26 |

FOREIGN PATENT DOCUMENTS

| | | | | |
|---|---|---|---|---|
| CN | 204809224 U | 11/2015 | | |
| CN | 105573020 A | 5/2016 | | |
| JP | 2015-227970 A | 12/2015 | | |
| WO | WO-2014087900 A1 * | 6/2014 | | G02B 5/00 |
| WO | WO-2014087901 A1 * | 6/2014 | | C08F 2/44 |

\* cited by examiner

OPTO-MECHANICAL UNIT HAVING A TUNABLE FILTER HOLDER AND A TUNABLE FILTER

CROSS REFERENCE

This application claims priority from U.S. provisional patent 62/634,996 filing date Feb. 26, 2018 which is incorporated herein in its entirety.

BACKGROUND

A tunable filter may include microelectromechanical system (MEMS) filters such as a MEMS Fabry-Perot filter (hereinafter—FP etalon).

The tunable filter can be optically coupled to a camera.

The tunable filter and the camera usually may belong to an opto-mechanical unit that should withstand mechanical loads such as drops, shock, and the like.

There is a growing need to provide a durable opto-mechanical unit.

SUMMARY

The summary should not be used to interpret the scope of the claims.

There may be provided an opto-mechanical unit that may include a tunable filter, a holder that surrounds the tunable filter, and mechanically-damping and gluing gel; wherein the holder may be spaced apart from the tunable filter; wherein the mechanically-damping and gluing gel surrounds the tunable filter and may be attached to the holder and to the tunable filter; and wherein the holder may include a camera interface that (a) defines a first inner space for receiving a part of a camera, and (b) introduces a gap between the tunable filter and the first inner space.

The tunable filter may have an optical axis that may be not obscured by the holder.

The tunable filter may have multiple sidewalls, a bottom region and a top region; wherein the mechanically-damping and gluing gel may be attached to the multiple sidewalls.

The mechanically-damping and gluing gel may be not attached to the bottom region and not attached to the top region.

The mechanically-damping and gluing gel may be attached to interiors of openings formed within the multiple sidewalls.

The tunable filter may have a pair of opposite sidewalls, a bottom region and a top region; and wherein the mechanically-damping and gluing gel may be attached to the pair of opposite sidewalls and does not obscure an optical path that passes through the tunable filter.

The camera interface may include a barrier for introducing the gap.

The gap may range between 10 and 400 micron.

The first inner space may be cylindrical and wherein the tunable filter may have a cross section that may be non-circular.

The tunable sensor may be positioned within a second inner space defined by the holder; and wherein the first inner space may be positioned between the second inner space and the camera.

The second inner space differs by shape from the first inner space.

The holder may be spaced apart from the tunable filter by a distance that may range between 10 and 500 micrometers.

The opto-mechanical unit may include conductors that may be electrically coupled to the tunable filter.

The opto-mechanical unit may include a rigid connector, wherein the rigid connector may include the conductors.

The opto-mechanical unit may include a flexible connector, wherein the flexible connector may include the conductors.

The flexible connector may be connected to a part of the opto-mechanical unit that differs from the holder.

The opto-mechanical unit may include a camera, wherein the flexible connector may be connected to the camera.

The opto-mechanical unit may include a connector that may include the conductors; wherein the holder may include a connector support element that may be arranged to support the connector.

The connector support element may be a horizontal bar.

The connector may be positioned above the holder.

The camera interface may include an adaptor for bridging between the first inner space and an exterior of the camera.

The opto-mechanical unit may include the camera; wherein the camera interface may include an adaptor for bridging between the first inner space and an exterior of the camera.

The mechanically-damping and gluing gel may be a cured mechanically-damping and gluing gel.

The mechanically-damping and gluing gel forms a rectangular frame between the holder and the tunable filter.

The mechanically-damping and gluing gel and the holder have coefficients of thermal expansion that may be similar to each other.

There may be provided an opto-mechanical unit that may include a tunable filter, a holder that surrounds the tunable filter, and one or more mechanically-damping elements for damping mechanical loads before reaching the tunable filter; wherein at least one mechanically damping element surrounds the tunable filter, may be positioned between the holder and the tunable filter and may be attached to at least one of the holder and the tunable filter; wherein the holder may be spaced apart from the tunable filter; and wherein the holder may include a camera interface that (a) defines a first inner space for receiving a part of a camera, and (b) introduces a gap between the tunable filter and the first inner space.

The one or more mechanically damping elements may include a foam element that contacts the tunable filter.

The one or more mechanically damping elements may include a foam element that may be glued to a gluing gel.

The one or more mechanically damping elements may include one or more springs.

There may be provided an opto-mechanical unit that may include a tunable filter, a mechanically-damping holder that surrounds the tunable filter, and one or more additional mechanically-damping elements; wherein the mechanically damping holder and the one or more additional mechanically-damping elements may be configured to damp mechanical loads before reaching the tunable filter; wherein at least one mechanically damping element surrounds the tunable filter, may be positioned between the holder and the tunable filter and may be attached to at least one of the holder and the tunable filter; wherein the holder may be spaced apart from the tunable filter; and wherein the holder may include a camera interface that (a) defines a first inner space for receiving a part of a camera, and (b) introduces a gap between the tunable filter and the first inner space.

The one or more additional mechanically damping elements may include a foam element.

The holder and the mechanically damping elements may be a single body made of a same mechanically damping material.

The mechanically damping element may be a cured gluing gel.

There may be provided a method for operating any of the opto-mechanical units illustrated in the application. The method may include acquiring images by an image sensor of an opto-mechanical unit while the tunable filter filters radiation before the radiation reaches the tunable sensor.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals.

DETAILED DESCRIPTION

Figure 1:
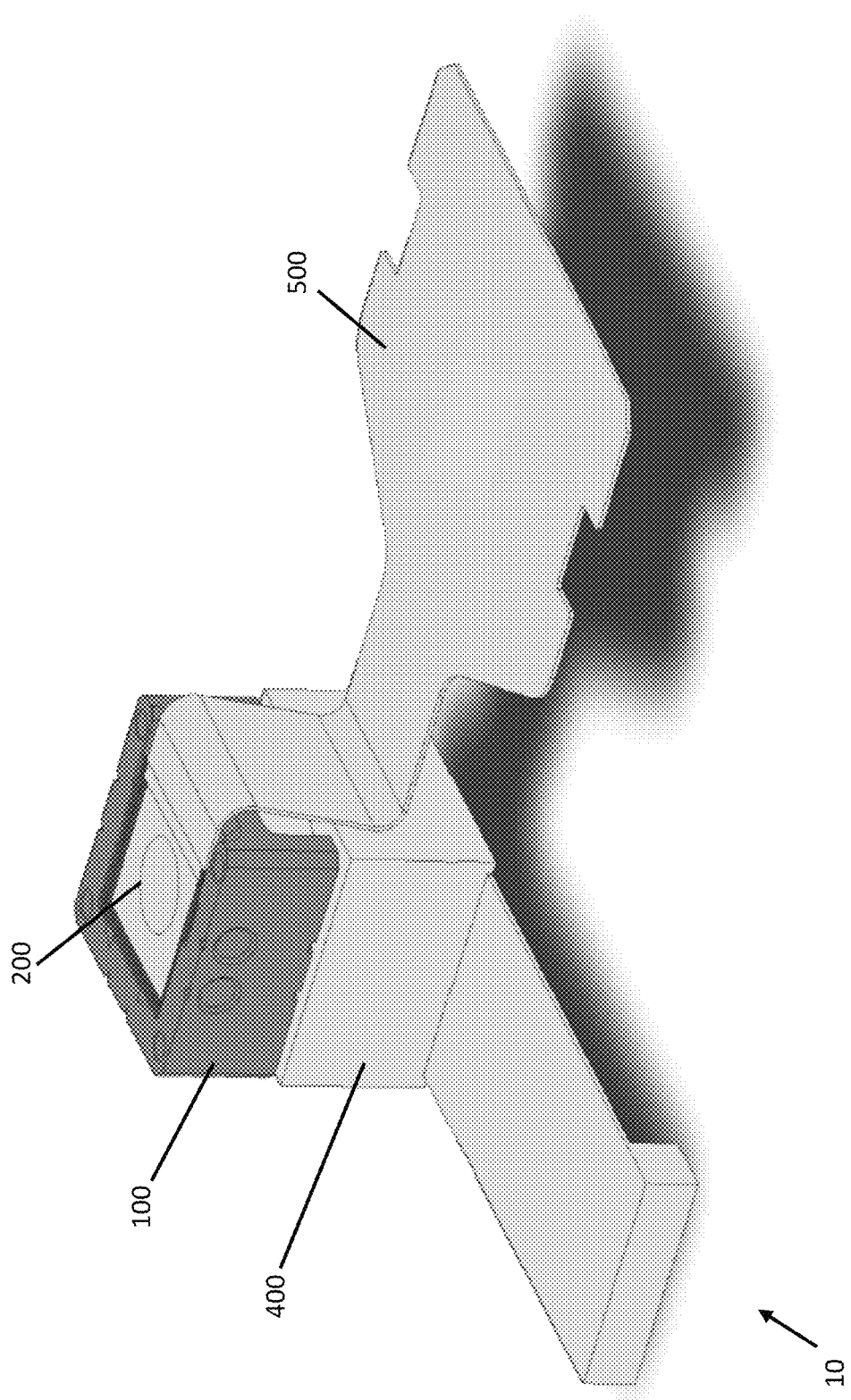
FIG. 1 is an example of an opto-mechanical unit.

Any reference to a opto-mechanical unit should be applied, mutatis mutandis to a method that is executed by an opto-mechanical unit and/or to a method for manufacturing the opto-mechanical unit.

The term "and/or" is additionally or alternatively.

The phrase "mechanically-damping and gluing gel" is a gel that damps mechanical loads transferred from the holder to the tunable filter. The mechanically-damping and gluing gel is also glued to the tunable filter and to the holder.

There may be provided an opto-mechanical unit that may include (i) a tunable filter, (b) a holder that surrounds the tunable filter, and (c) mechanically-damping and gluing gel. The holder surrounds the tunable filter in the sense that it is positioned on multiple sides of the tunable filter—preferably without surrounding all sides of the tunable filter.

The opto-mechanical unit may also include a camera that may be adapted to interface with a camera interface of the holder.

The holder may be spaced apart from the tunable filter— the mechanically-damping and gluing gel may be positioned between the tunable filter and the holder. The mechanically-damping and gluing gel may be injected through openings formed in the holder and then be cured. Accordingly—the mechanically-damping and gluing gel may also be positioned in these openings.

The mechanically-damping and gluing gel may surround the tunable filter and may be attached to the holder and to the tunable filter. Thus—the mechanically-damping and gluing gel may prevent direct contact between the holder and the tunable filter.

The holder may include a camera interface that (a) defines a first inner space, and (b) introduces a gap between the tunable filter and the camera interface. The gap may prevent the tunable filter and a camera (when inserted into the camera interface) from contacting (and even hitting) each other—even when the opto-mechanical unit is subjected to mechanical loads.

According to one example, the tunable filter may be positioned in an optical path between the camera and the surroundings of the opto-mechanical unit.

According to another example, the tunable filter may be positioned in an optical path between the image sensor and the lens barrel of a camera.

According to yet another example, the tunable filter may be positioned in an optical path within the lens barrel of a camera.

The tunable filter has an optical axis that may be not obscured by the holder.

For example—the tunable filter may have multiple sidewalls, a bottom region and a top region. The mechanically-damping and gluing gel may be attached to the multiple sidewalls.

In some examples, the mechanically-damping and gluing gel may not be attached to the bottom region and may not be attached to the top region. Alternatively—the mechanically-damping and gluing gel may be attached to at least a part of the bottom region and/or to at least a part of the top region.

The mechanically-damping and gluing gel may be attached to interiors of openings formed within the multiple sidewalls.

The tunable filter may have a pair of opposite sidewalls, a bottom region and a top region. The mechanically-damping and gluing gel may be attached to the pair of opposite sidewalls and may not obscure an optical path that passes through the tunable filter. In some examples, the optical path may start at an object that should be imaged by the image sensor of the camera and may end at the image sensor of the camera.

The first inner space may be cylindrical and wherein the tunable filter has a cross section that may be non-circular.

The tunable filter may be positioned within a second inner space defined by the holder. The first inner space may be positioned below (or above) the second inner space.

The second inner space may differ by shape from the first inner space.

The holder may be spaced apart from the tunable filter by a distance that ranges between—10-500 micrometers.

The opto-mechanical unit may include one or more conductors that may be electrically coupled to the tunable filter.

The conductors may be included in a flexible connector, in a rigid connector, or any other type of connector.

The opto-mechanical unit may include a rigid connector, wherein the rigid connector may include the conductors.

The connector may be connected to any part of the opto-mechanical unit.

A single holder may be adapted to be connected to cameras of different sizes. This can be obtained by using an adaptor for bridging between the first inner space and an exterior of the camera. For example—assuming that the first inner space is cylindrical and that the upper part of the camera that is inserted into the first inner space is also cylindrical then the adaptor may be a ring that has (a) an exterior that matches the exterior of the first inner space, and (b) an interior that matches the exterior of the upper part of the camera.

In some examples, the height of the opto-mechanical unit does not exceed 2 mm; in other examples the height of the opto-mechanical unit does not exceed 1 mm; in yet other examples the height of the opto-mechanical unit does not exceed 1 mm 1.5 mm.

The mechanically-damping and gluing gel may be a cured mechanically-damping and gluing gel.

The mechanically-damping and gluing gel may form a rectangular frame between the holder and the tunable filter.

The mechanically-damping and gluing gel and the holder may have coefficients of thermal expansion (CTE) that may be similar to each other.

Figure 2:
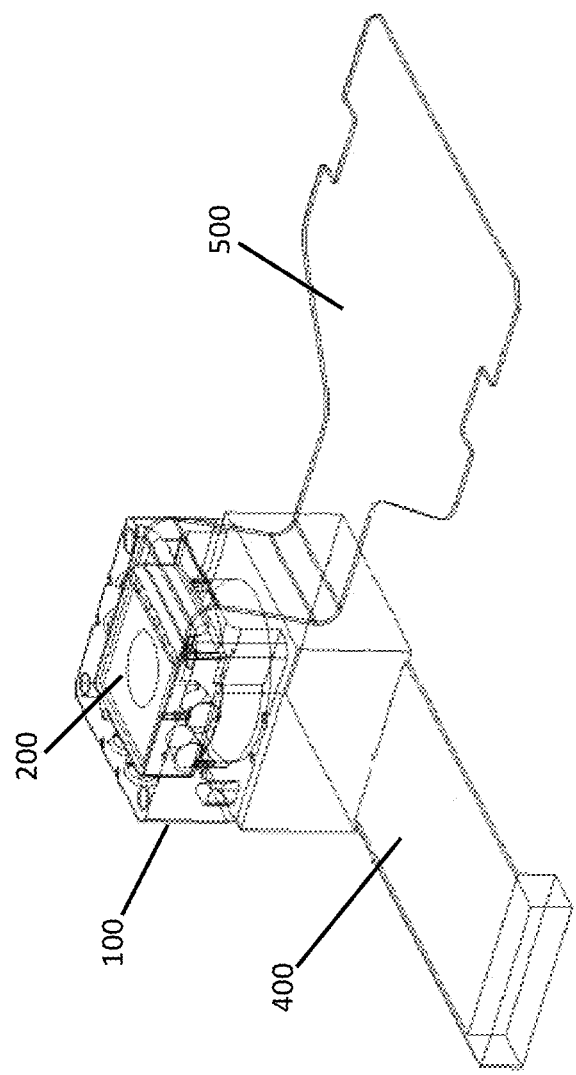
FIG. 2 is an example of an opto-mechanical unit.

FIGS. 1 and 2 illustrate opto-mechanical unit 10 that includes tunable filter 200, holder 100 that surrounds tunable filter 200, mechanically-damping and gluing gel (not shown), flexible connector 500 and camera 400.

It should be noted that flexible connector 500 and camera 400 may or may not belong to opto-mechanical unit 10. The flexible connector 500 may be connected to camera 400 or to any other part of opto-mechanical unit 10 in order to prevent (or at least reduce) mechanical loads from being conveyed by flexible connector 500 to tunable filter 200.

Flexible connector 500 includes conductors for electrically coupling the tunable filter to another electrical unit or component—such as an image processor, a controller, and the like. The conductors may convey control signals, may convey feedback signals, and the like.

Figure 3:
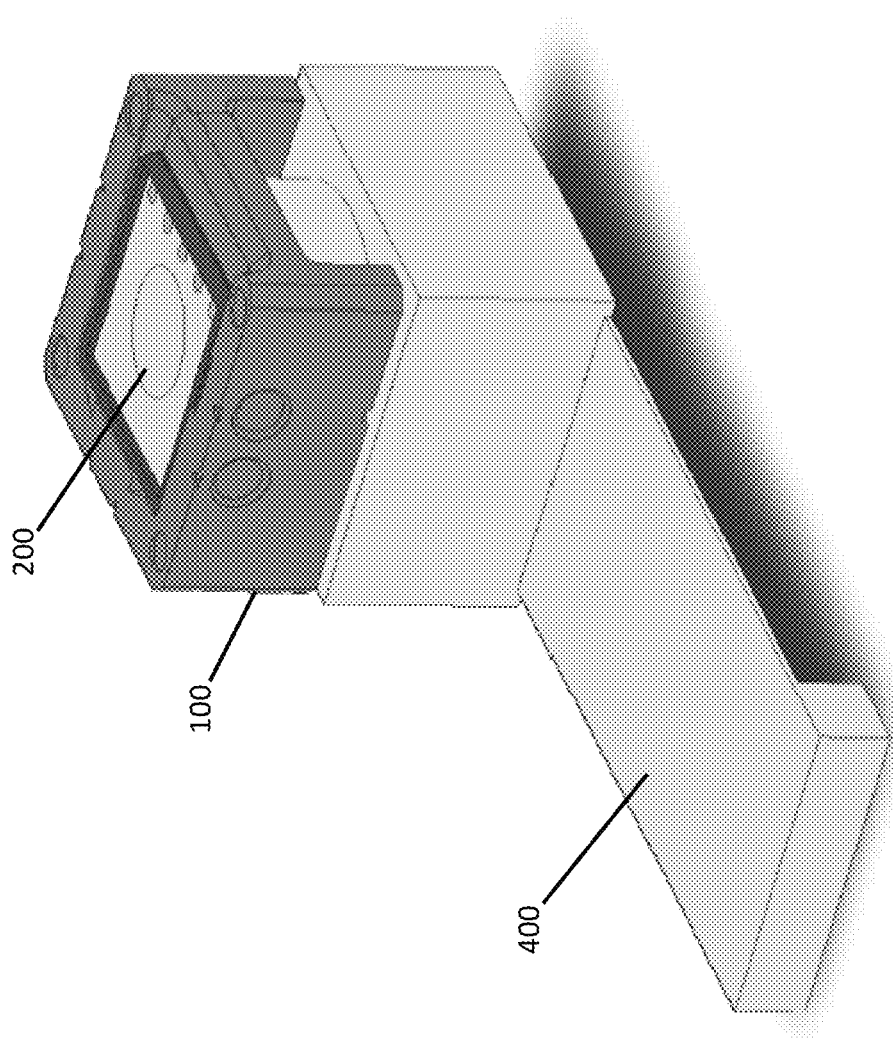
FIG. 3 is an example of an opto-mechanical unit.

FIG. 3 illustrates opto-mechanical unit 10 without flexible connector 500.

Figure 4:
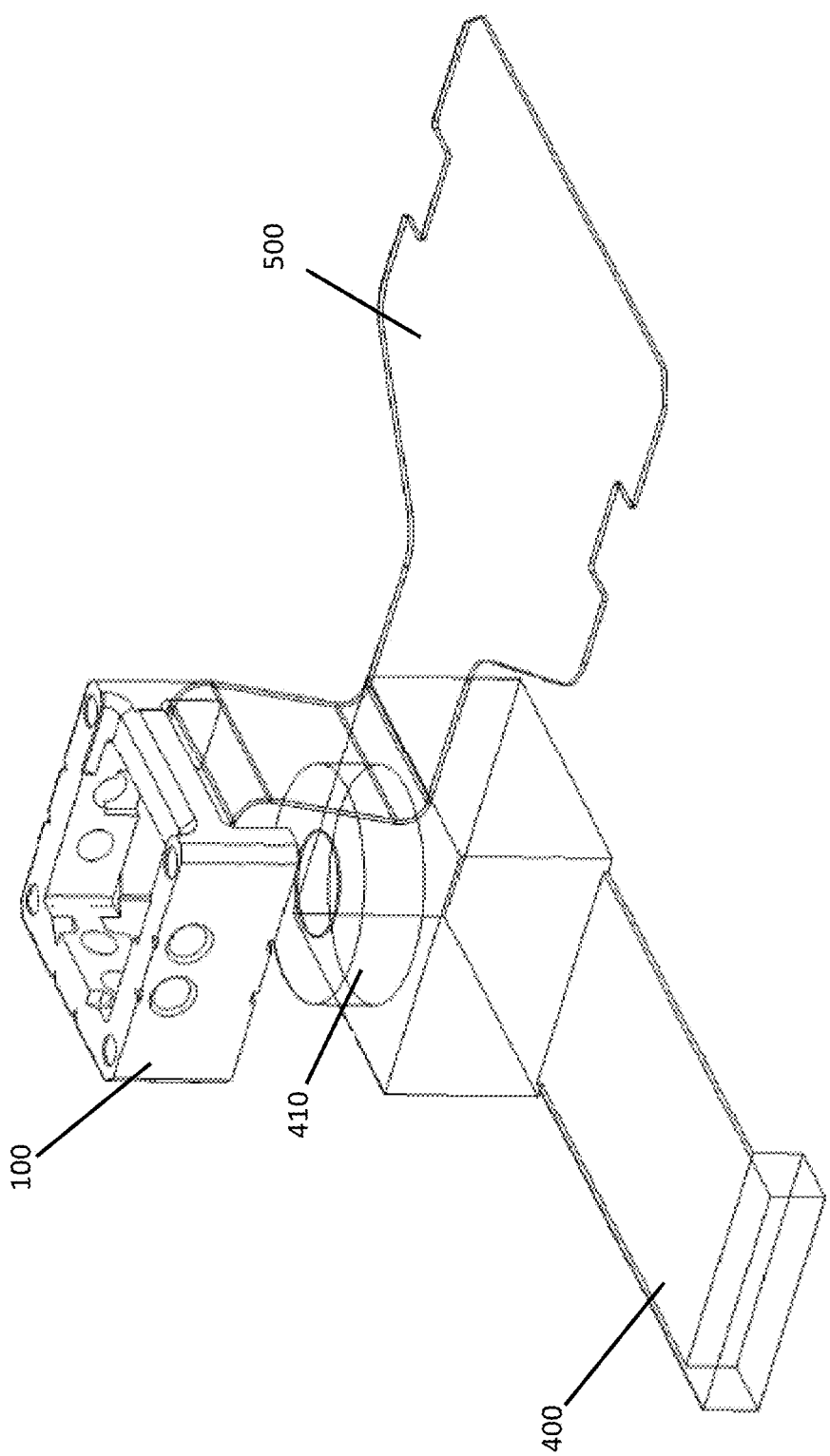
FIG. 4 is an example of an opto-mechanical unit.

FIG. 4 illustrates an exploded view of opto-mechanical unit 10 that includes tunable filter (not shown in FIG. 4) 200, holder 100, mechanically-damping and gluing gel (not shown), flexible connector 500 and camera 400. FIG. 4 illustrates an upper (cylindrical shaped) portion 410 of camera 400. Upper portion 410 of camera is adapted to fit into a first inner space of a camera interface of holder 100.

Figure 5:
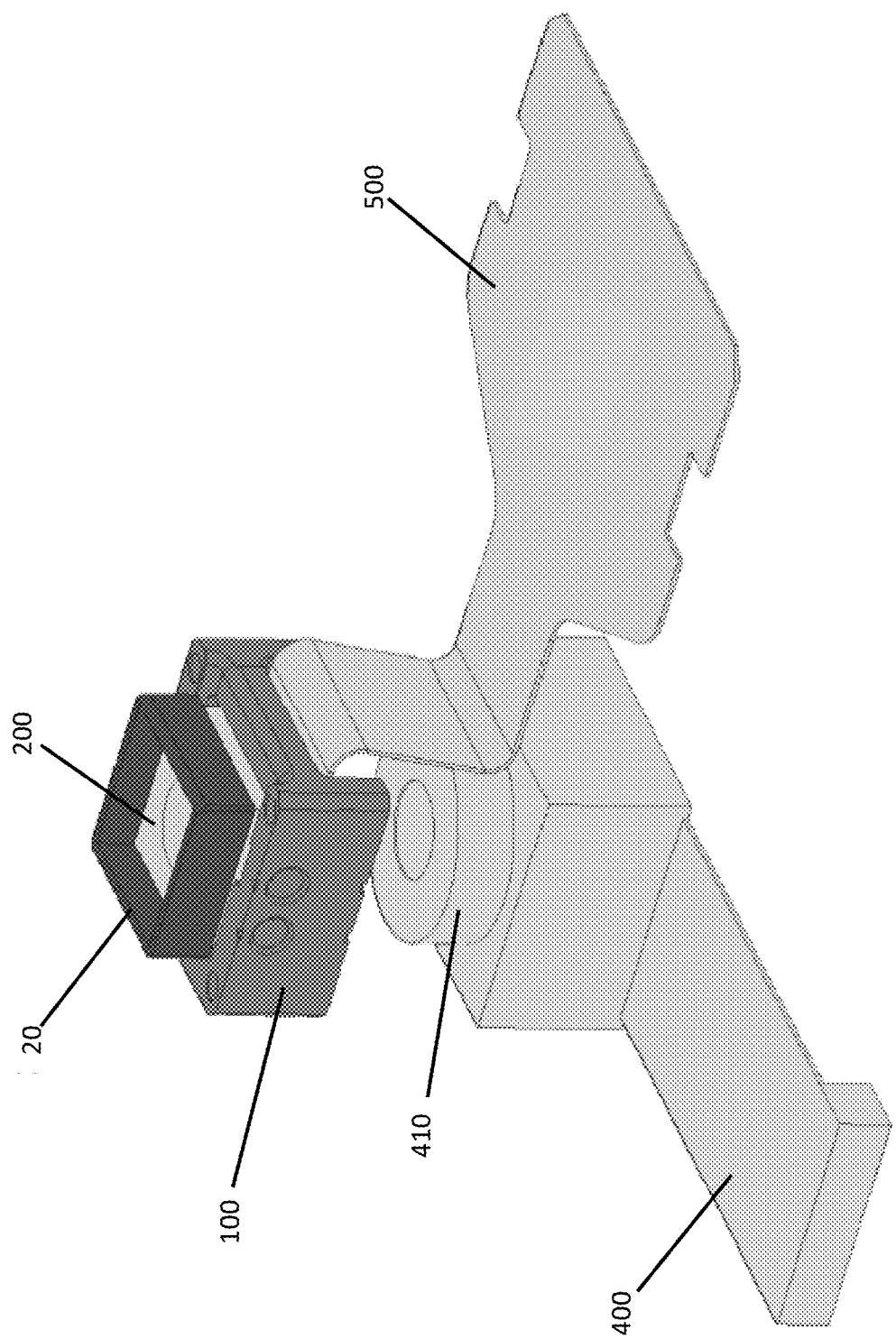
FIG. 5 is an example of an opto-mechanical unit.

FIG. 5 illustrates an exploded view of opto-mechanical unit 10 that includes tunable filter 200, holder 100, mechanically-damping and gluing gel 20, flexible connector 500 and camera 400. Mechanically-damping and gluing gel 20 is cured and may form a rectangular frame that is positioned between tunable filter 200 and holder 100.

Figure 6:
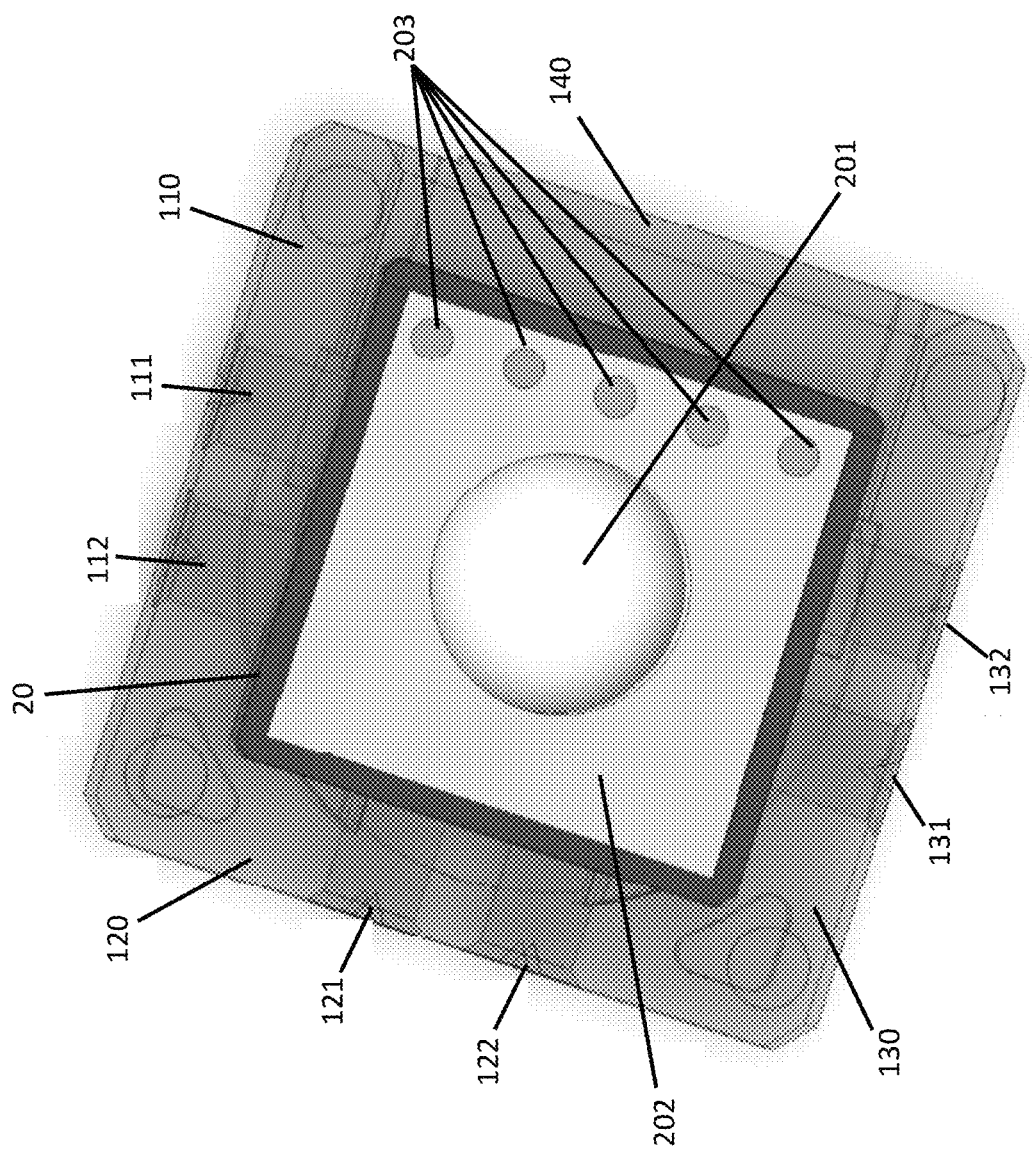
FIG. 6 is an example of one or more components of an opto-mechanical unit.
Figure 7:
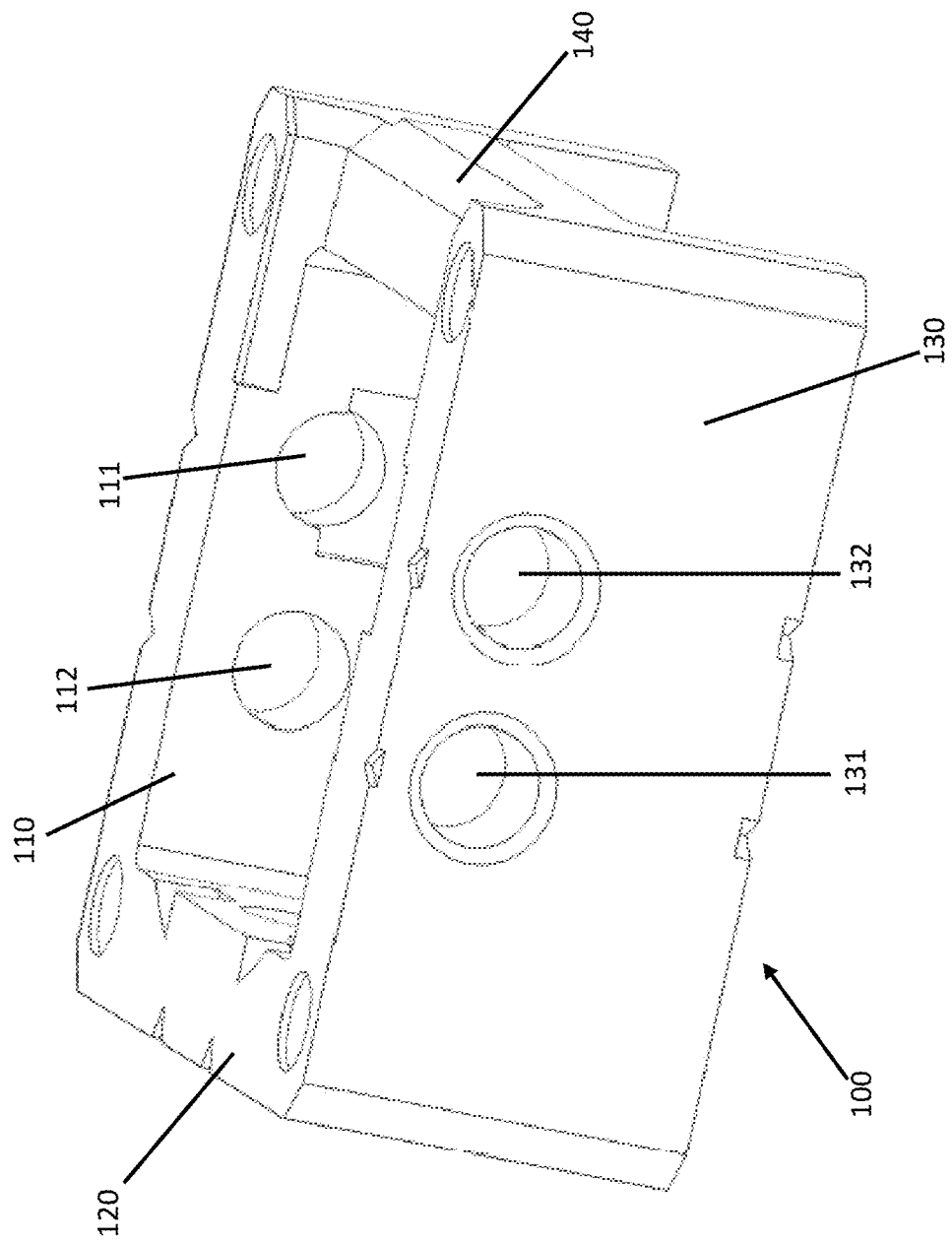
FIG. 7 is an example of a holder.
Figure 8:
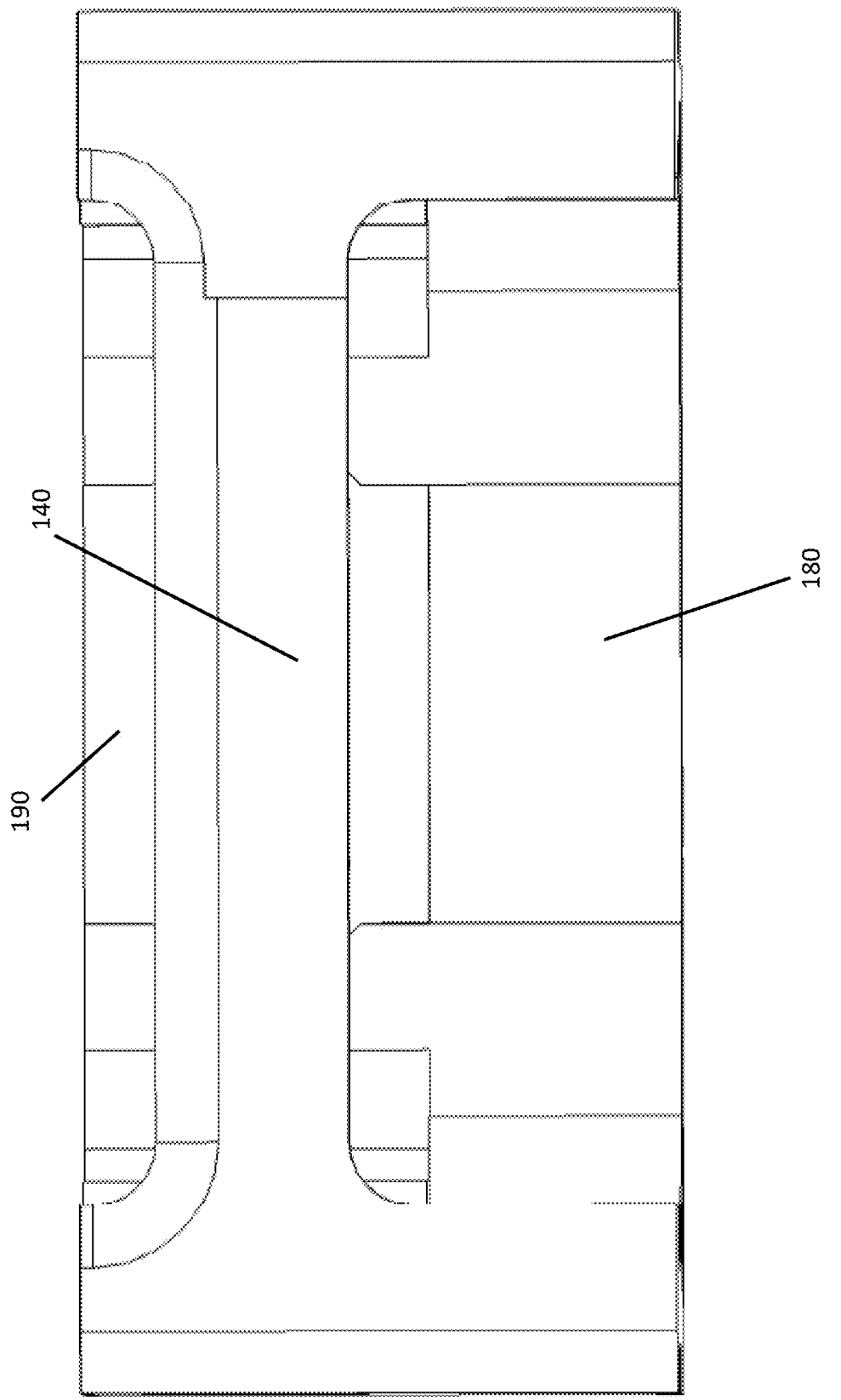
FIG. 8 is an example of a holder.
Figure 9:
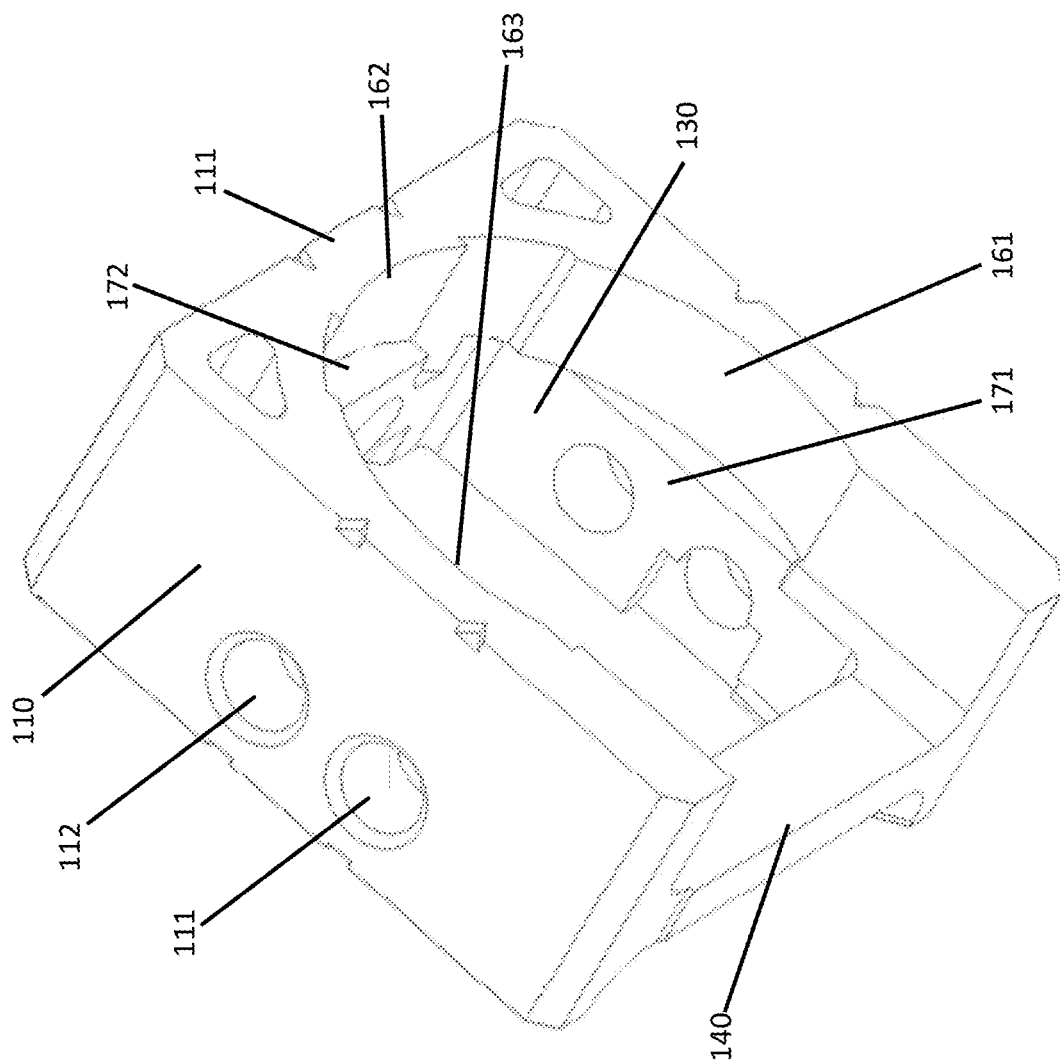
FIG. 9 is an example of a holder.
Figure 10:
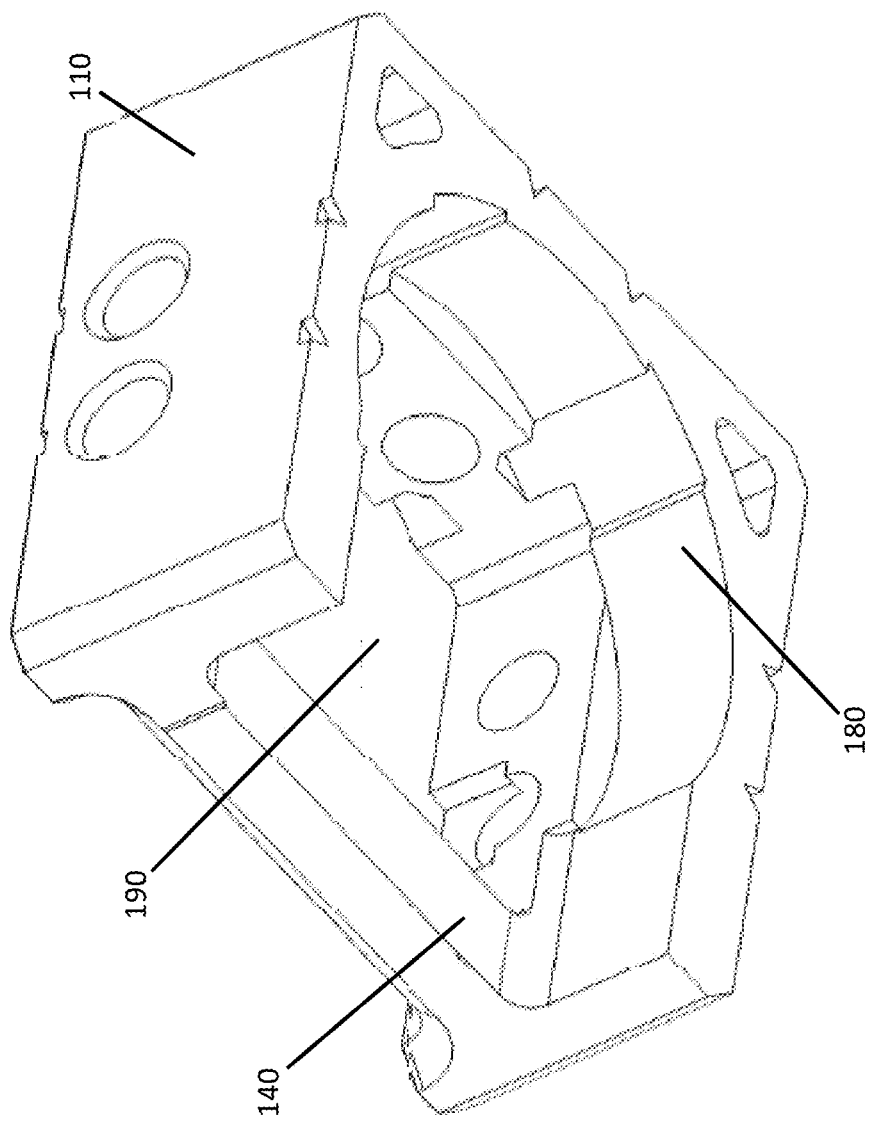
FIG. 10 is an example of a holder.

FIG. 6 illustrates, in a top view, tunable filter 200, holder 100 and mechanically-damping and gluing gel 20. FIG. 7 is a perspective view of holder 100. FIG. 8 is a side view of holder 100. FIG. 9 is a perspective view of holder 100. FIG. 10 is a perspective view of holder 100.

FIG. 6 shows an example of tunable filter 200 designed with a body that has a cuboid shape and that includes upper surface 202 and lower surface (not shown), electrical connectors 203 (that may be electrically coupled to the conductors of flexible connector 500) and a circular optical active region such as (but not limited to) mirror 201.

Tunable filter 200 may be surrounded by mechanically-damping and gluing gel 20. The mechanically-damping and gluing gel 20 is surrounded by holder 100.

In the illustrated example, holder 100 has a substantially rectangular shape and includes first sidewall 110, second sidewall 120, third sidewall 130 and a horizontal bar 140. First and third sidewalls 110 and 130 are parallel to each other and are orthogonal to second sidewall 120 and horizontal bar 140.

Openings 111 and 112 are formed in first sidewall 110. Openings 121 and 122 are formed in second sidewall 120. Openings 131 and 132 are formed in third sidewall 130.

During the assembling of opto-mechanical unit 10 the mechanically-damping and gluing gel 20 may be injected through openings 111, 112, 121, 122, 131 and 132 and be positioned within these openings and between holder 100 and tunable filter 200. The mechanically-damping and gluing gel 20 may be injected before being cured—in an elastic state—and be cured (heat and/or radiation) after being injected.

It is noted (and detailed in FIGS. 8 and 10) that the interior of the holder may define (a) first inner space 180 for receiving camera 400 (especially upper part 410), and (b) second inner space 190 for receiving tunable filter 200 and mechanically-damping and gluing gel 20.

Second inner space 190 is positioned above first inner space 180. Second inner space 190 has a substantially rectangular cuboid shape. First inner space 180 has a substantially cylindrical shape.

Holder 100 may include a barrier—such as one or more steps that prevents the camera (when positioned in first inner space) from touching (and even hitting) the tunable filter positioned within second inner space 190. The relative movement between the camera and the tunable filter could be caused, for example, by a mechanical shock and or load which causes the tunable filter to displace closer to the camera. In another example, a part of the camera module (for example at least some part of 410) could be dynamically displaced by an actuation mechanism. In yet another example, the relative movement between the camera and the tunable filter could be caused by any combination including the previously described examples. FIG. 9 illustrates two steps 171 and 172 out of three steps, and three arced parts of the holder 161, 162 and 163 that define first inner space 180.

It should be noted that the shape, size and other parameters of mechanically-damping and gluing gel 20, holder 100, tunable filter 200 and flexible connector 500 may differ from those illustrated in FIGS. 1-10.

For example— a. The shape, size and number of openings formed in holder may differ from those of openings 111, 112, 121, 122, 131 and 132.
b. Tunable filter 200 may have a shape that substantially differs from a rectangular cuboid—for example the tunable filter may have a cylindrical shape, or be any other type of polyhedron, have one or more curved surfaces, and the like.
c. Holder 100 may have a shape that substantially differs from a rectangular frame—for example the holder may have a cylindrical shape, or be any other type of polyhedron, have one or more curved surfaces, and the like.
d. Holder 100 may include more or less sidewalls, may have four sidewalls without a rectangular bar (denoted 140 in FIG. 8) the rectangular bar may be replaced by any other element.
e. Flexible connector 500 may be replaced by a rigid connector or may include both rigid and flexible parts.
f. Holder 100 may include an exterior camera interface, defined as a first exterior space, instead or additionally to the first inner space.

There are various types of shear rate dependent materials such as Newtonian (characterized by linear stress-shear relation), and non-Newtonian materials such as Shear thinning (viscosity decreases with the rate of shear strain), and Shear thickening (viscosity increases with the rate of shear strain).

Shear thinning materials may also be referred to as pseudoplastic materials—or materials that exhibit pseudoplastic behavior—which is usually defined as excluding (or at least substantially excluding) time-dependent effects, such as thixotropy. It has been found that a small amount of thixotropy can be allowable at the very high frequencies.

Shear thinning/pseudoplastic gels are solid gels which can shear-thin and consequently flow under a proper shear stress but immediately recover back into a solid on removal of the stress.

Shear thinning gels could be made with many different materials (including polymers such as polyethylene glycol, or PEG). Xanthan Gum is a one commercially available example.

Figure 11:
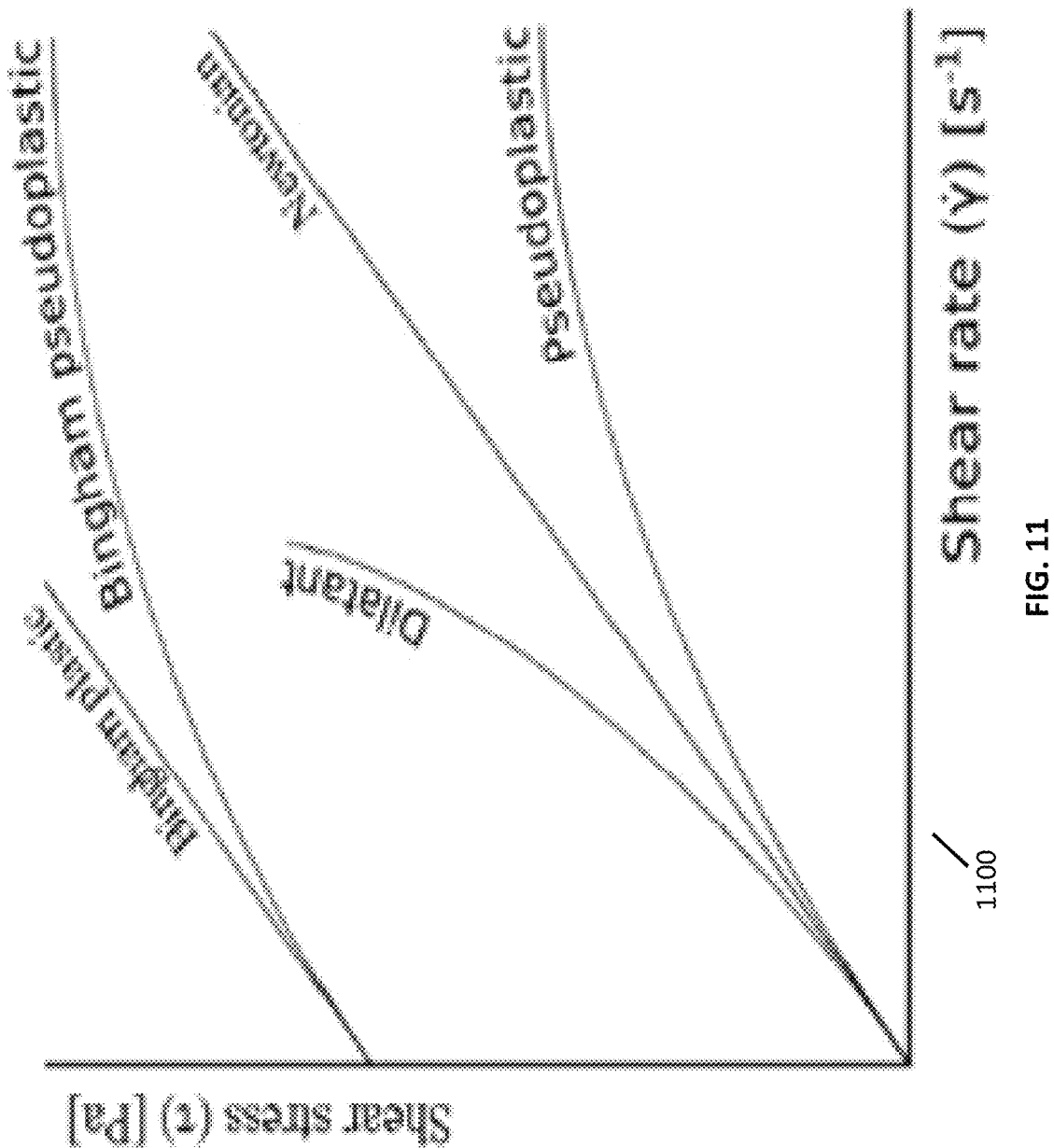
FIGS. 11-15 illustrate various devices, models and damping responses.

FIG. 11 includes graph 200 that illustrates behaviors of various materials.

Figure 12:
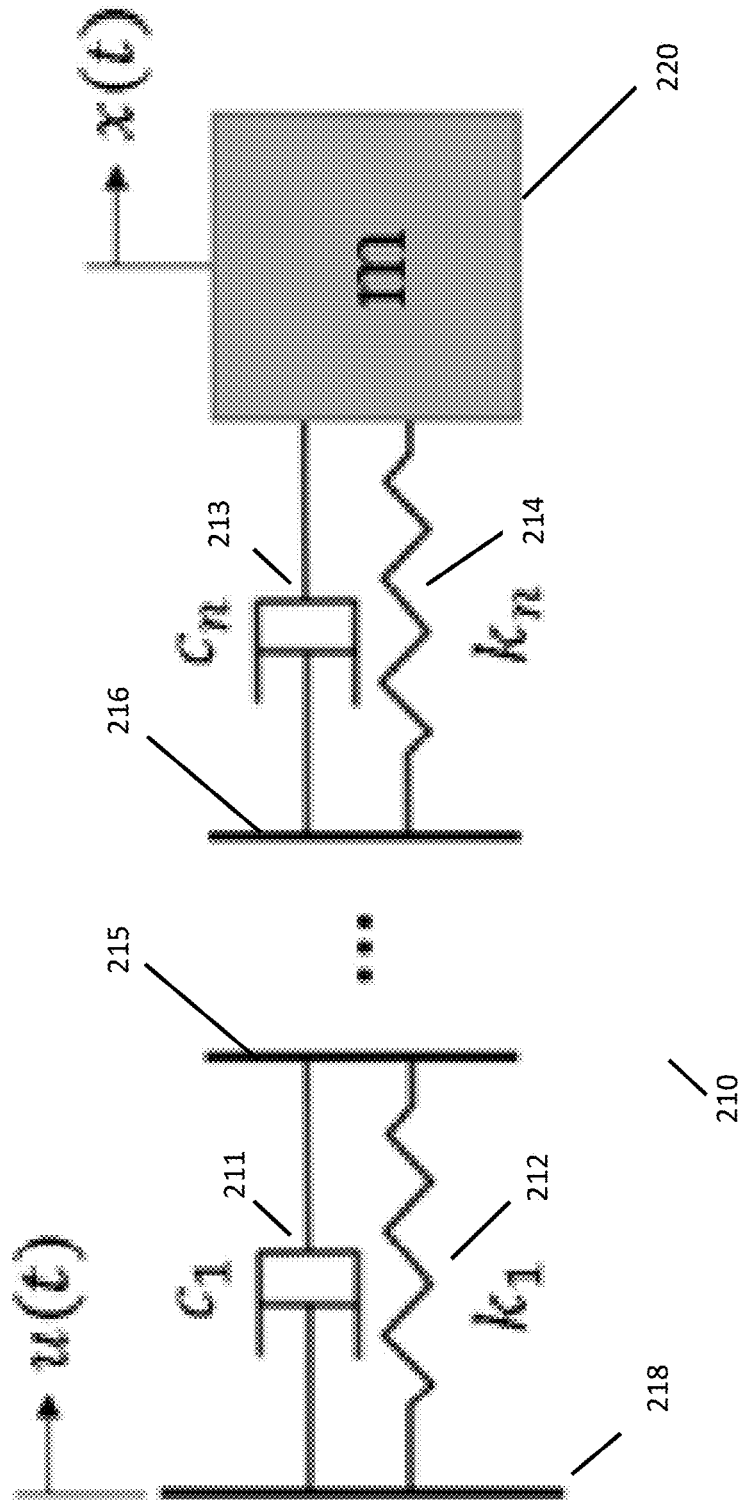

The mechanically-damping and gluing gel may exhibit the following characteristics:
1. Viscoelasticity. Viscoelasticity is the property of materials that exhibit both viscous and elastic characteristics when undergoing deformation. Viscous materials resist shear flow and strain linearly with time when a stress is applied. Elastic materials strain when stretched and quickly return to their original state once the stress is removed. Viscoelastic materials have elements of both of these properties and, as such, exhibit time-dependent strain. Whereas elasticity is usually the result of bond stretching along crystallographic planes in an ordered solid, viscosity is the result of the diffusion of atoms or molecules inside an amorphous material.
2. Has a CTE (coefficient of thermal expansion) similar to that of the materials of the tunable filter (e.g. approximately 2.8-3.2 ppm/K at room temperature for a filter made mostly of glass, approximately 2-3.2 ppm/K at room temperature for a filter made mostly of Silicon, or some value in between for a filter made of a combination of these materials)
3. Sufficiently soft (e.g. Dynamic modulus is less than 10 MPa) at the (high) shock and drop frequencies such that the displacement transmitted to the tunable filter is by orders of magnitude smaller than the displacement of the holder. This is exemplified by the gain vs. frequency FIG. 13.
4. The resulting quality factor of the tunable filter-gel-holder structure should be sufficiently low at the defined handling, and/or shock, and/or drop frequencies such that any oscillations in the mechanical response of the system are quickly suppressed.
5. U.V or low temperature cured (<60° C.)
6. Fluid before curing
7. Fit into narrow gaps (<0.3 mm)
8. Adhesive strength is bigger than material's tensile strength FIG. 12 illustrates a model 210 of multiple damping layers—the model includes a damper (211 and 213) and a spring (212 and 214) per (a) interface (215 and 216) between layers, (b) interface between a layer and the holder (218), and (c) an interface between a layer and the tunable filter (220).

Using Newton's $2^{nd}$ law of physics and by linearizing the dynamic behavior of the holder-gel-tunable filter system, the governing motion equation could be approximated as:

$$m\ddot{x}(t) + \tilde{c}\dot{x}(t) + \tilde{k}x(t) = \tilde{k}u(t) + \tilde{c}\dot{u}(t) \qquad (1)$$

Where u(t) is the time dependent displacement of the holder due to external mechanical load, and x(t) is the according mechanical displacement of the tunable filter.

Additionally, $\tilde{k}$ and $\tilde{c}$ are the effective stiffness and damping coefficients of the single or multi-layer damping gel, given by the following expressions in which $k_i$ and $c_i$ are the stiffness and damping coefficients of each layer i:

$$\tilde{k} = (k_1^{-1} + k_2^{-1} + \ldots + k_n^{-1})^{-1} \quad \tilde{c} = (c_1 + c_2 + \ldots c_n) \qquad (2)$$

Please note that the stiffness and the damping coefficients of a general material of some given geometry are not necessarily constant nor linear, thus equations 1-2 are only a linear approximation of the system's more complex dynamics.

Under the assumptions of a linear system, for a simple harmonic displacement of the holder in the form of $u(t) = A\sin(\omega t)$, the according tunable filter displacement is given by:

$$x(t) = g(\omega) A \sin(\omega t + \phi(\omega)) \qquad (3)$$

where $g(\omega)$ and $\phi(\omega)$ are the system's gain and phase lag, given as a function of angular frequency $\omega = 2\pi f$, by:

$$|g(\omega)| = \frac{\sqrt{(\tilde{c}\omega)^2 + \tilde{k}^2}}{\sqrt{(\tilde{k} - m\omega^2)^2 + (\tilde{c}\omega)^2}} \qquad (4)$$

$$\phi(\omega) = \tan^{-1}\left(\frac{\tilde{c}\omega}{\tilde{k}}\right) - \tan^{-1}\left(\frac{\tilde{c}\omega}{\tilde{k} - m\omega^2}\right) \qquad (5)$$

Assuming that the acceleration acting on the holder has the form:

$$\frac{d^2 u(t)}{dt^2} = -A\omega^2 \sin(2\pi f t), \qquad (6)$$

the mechanically-damping and gluing gel may damp the following mechanical loads:

| | Drop | Shock | Handling |
|---|---|---|---|
| Frequency range, f [Hz] | $O(10^6 - 10^7)$ | $O(10^3)$ | $O(10)$ |
| Amplitude range, $\left\|\frac{d^2 u(t)}{dt^2}\right\|$ [m/s^2] | $O(10^5 - 10^6)$ | $O(10^5)$ | $O(10 - 10^2)$ |

The mechanically-damping and gluing gel can be selected out of three different fluid polymers types.
  Newtonian—characterized by linear stress-shear relation
  Shear thinning—viscosity decreases with the rate of shear strain
  Shear thickening—viscosity increases with the rate of shear strain See also—FIG. 11 that illustrates the behavior of various materials.

The softening of shear thinning gels at high frequencies seems to be the ideal choice as it has the potential to considerably dampen high frequency vibrations such as shock and drop which exhibit very high amplitudes. (Handling is occurring at relatively low frequencies and low accelerations, hence the gel could be allowed to be stiffer at that frequencies range).

Figure 13:
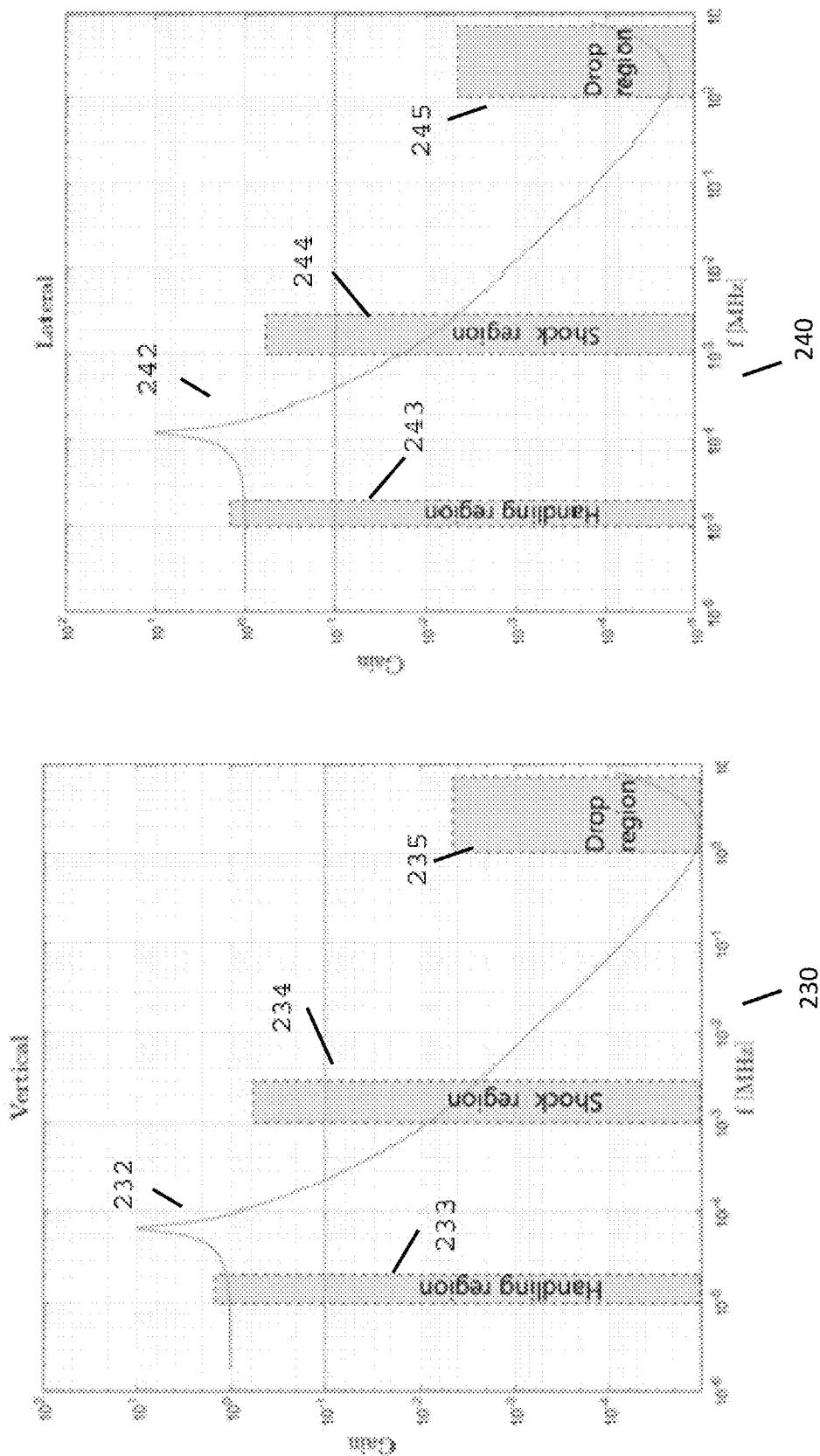

Even though thinning gels seems to be ideal, it has been found that a shear thickening mechanically-damping and gluing gel such as but not limited to Taica GEL H can be used while meeting the requirements of sufficient damping. FIG. 13 was obtained for a filter mass of 23 mg and a Gel H forming a square 200 um thick frame with an exterior size of 3.4 mm×3.4 mm×1 mm.

FIG. 13 includes graphs 230 and 240 that illustrate examples (see curves 232 and 242) of a damping of the mechanically-damping and gluing gel at different frequencies—for vertical and horizontal mechanical loads. There may be provided mechanically-damping and gluing gel with other damping curves—especially not amplifying handling vibrations (caused by a user that holds a device—denoted "holding region" 233 and 243 in FIG. 13), while damping vibrations (oscillations) in higher frequencies—such as the shock region—234 and 244 in FIG. 13—(shocks absorbed by the device), and the drop region—235 and 245 in FIG. 13—(caused by dropping the device).

In FIG. 13 the holding region is at the order of tenths of Hertz ($10^{-5}$ MegaHertz), the shock region is at the order of KiloHertz ($10^{-3}$ MegaHertz) and the drop region is at the very high frequency of MegaHertz (1-10 Megahertz).

To meet the requirements shown in Table 1, an example for GEL H was made using Eq. 4.

$$|g(\omega)| = \frac{\sqrt{(c\omega)^2 + k^2}}{\sqrt{(k - m\omega^2)^2 + (c\omega)^2}} = \tag{7}$$

$$\left\{ c = \frac{k}{\omega} \cdot \frac{E''}{E'} \omega_n = \sqrt{\frac{k}{m}} \right\} = \frac{\sqrt{(E''/E')^2 + 1}}{\sqrt{(1 - \omega^2/\omega_n^2)^2 + (E''/E')^2}}$$

Where k is the integrated stiffness of the layer. In practice, k could be calculated for example by using the finite elements method.

It should be noted that the damping can be done by one element or multiple elements—including but not limited to one or more types of mechanically-damping and gluing gel, one or more foams or any other non-gel elements. The mechanically-damping and gluing gel can be replaced by a gluing gel and one or more other mechanically damping elements.

Figure 14:
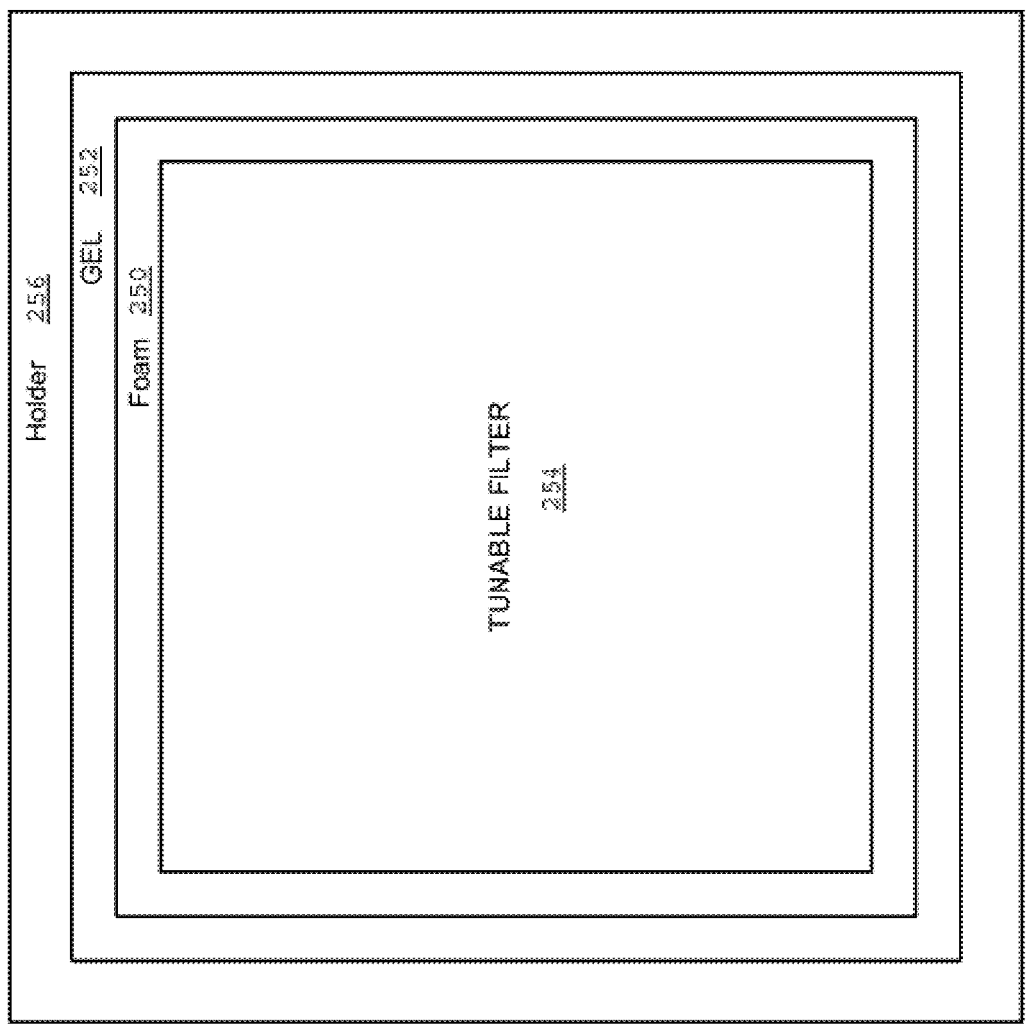

FIG. 14 illustrates a "foam" 250 that might have a stiffness which doesn't depend on frequency and which is enclosed by a second layer of glue (which might be a gel 252 but also other materials such as epoxy).

The damping requirements is primarily achieved by the "foam" (with some possible additional assistance of the glue damping), while the glue layer enable us to comfortably fix the tunable filter 254 in the holder 256. The foam could either be attached to the tunable filter or to the holder.

Figure 15:
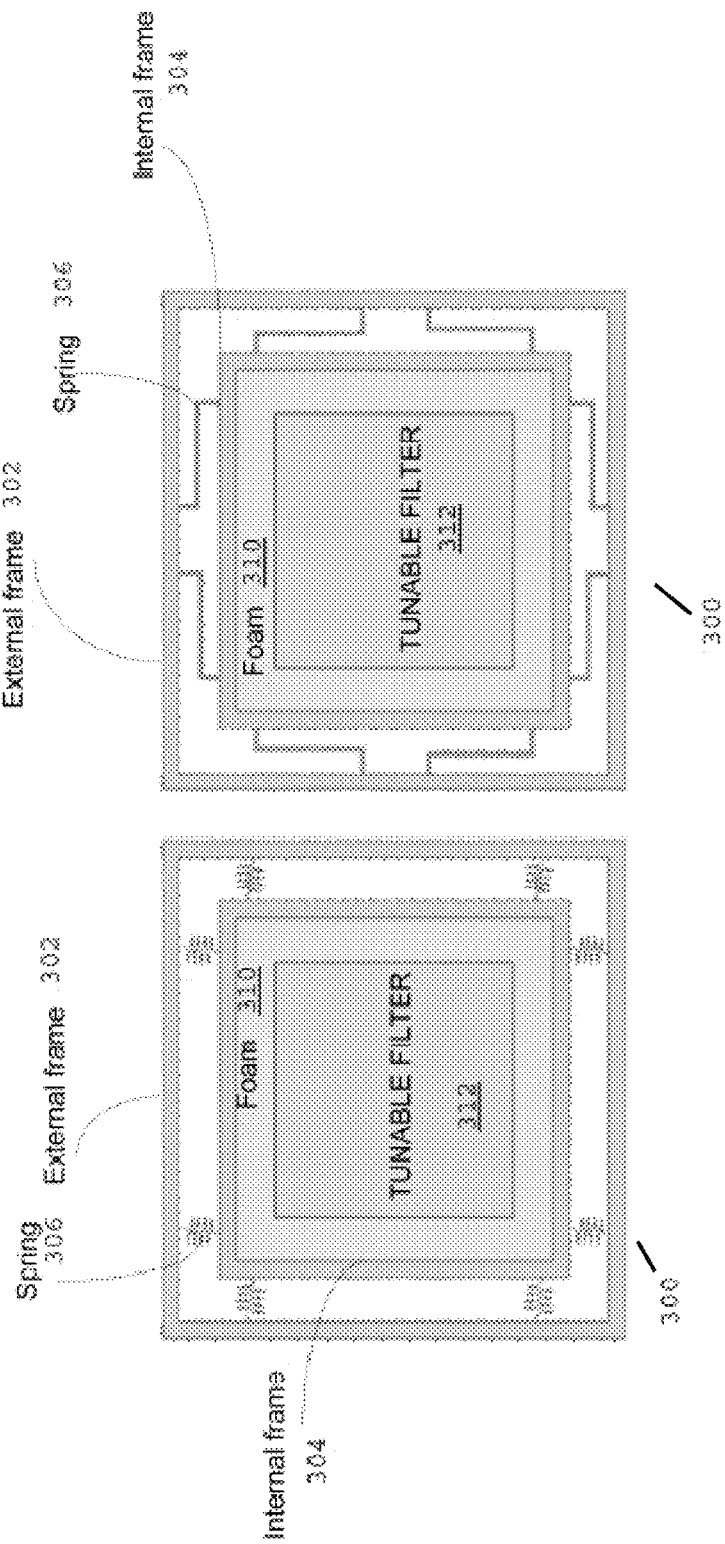
Figure 16:
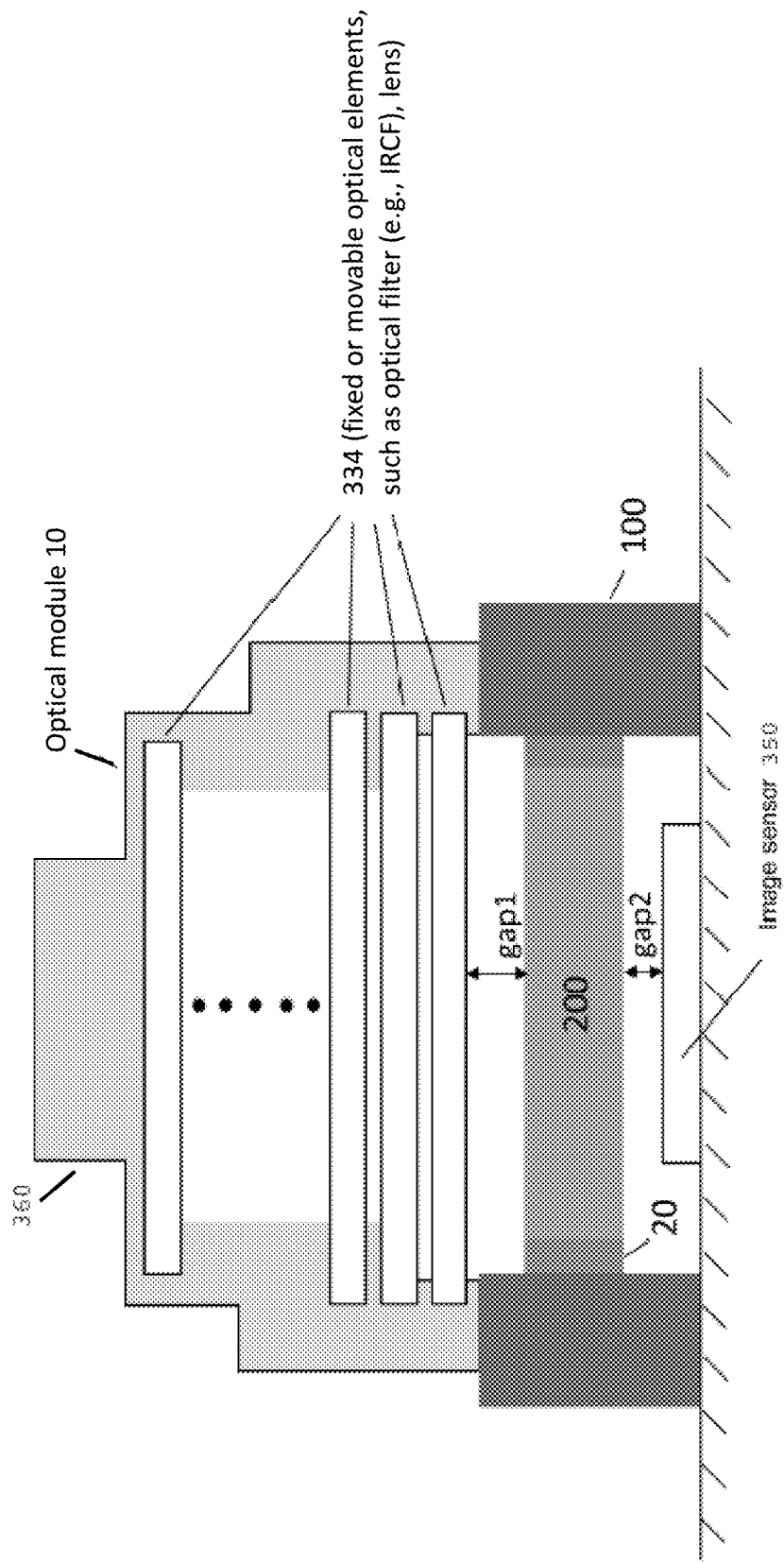
FIGS. 16-23 illustrates various opto-mechanical units.
Figure 17:
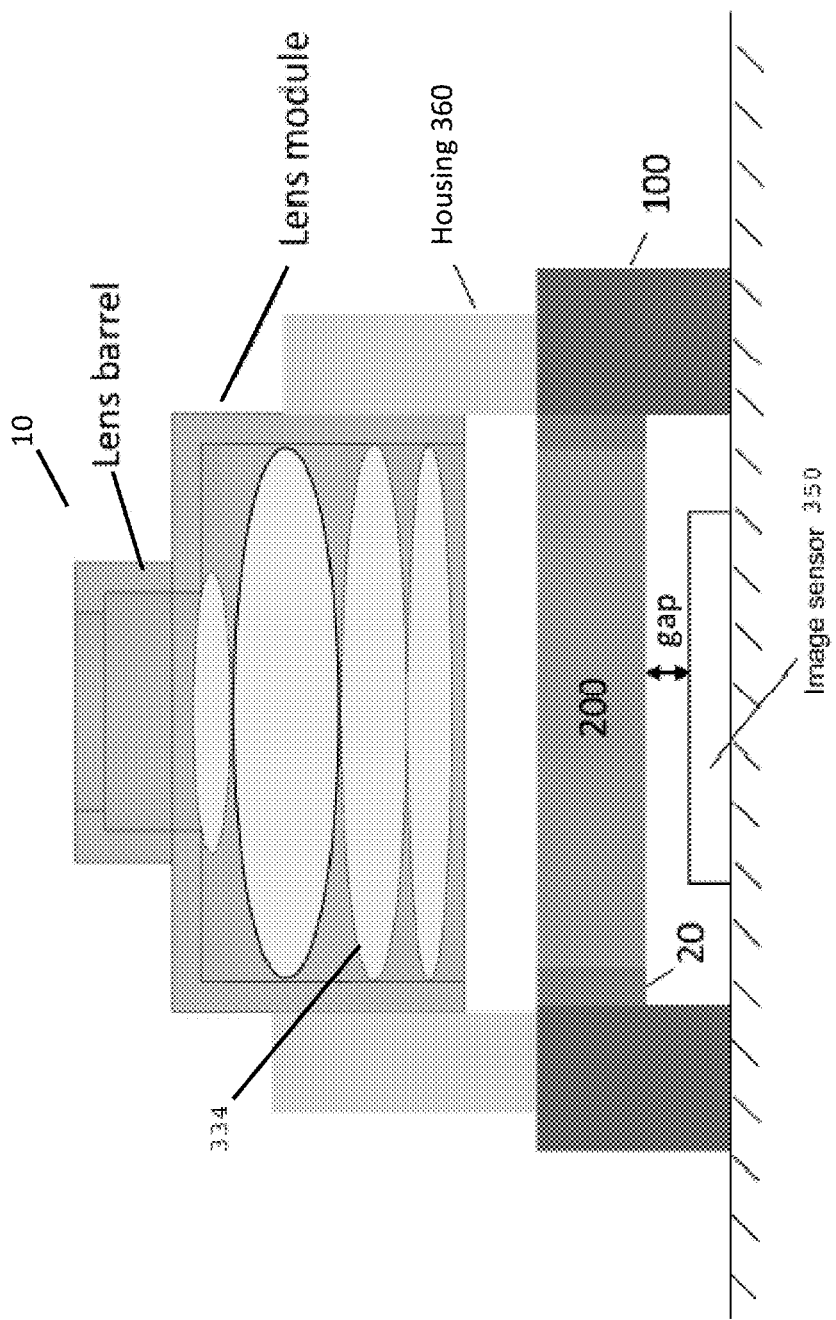
Figure 18:
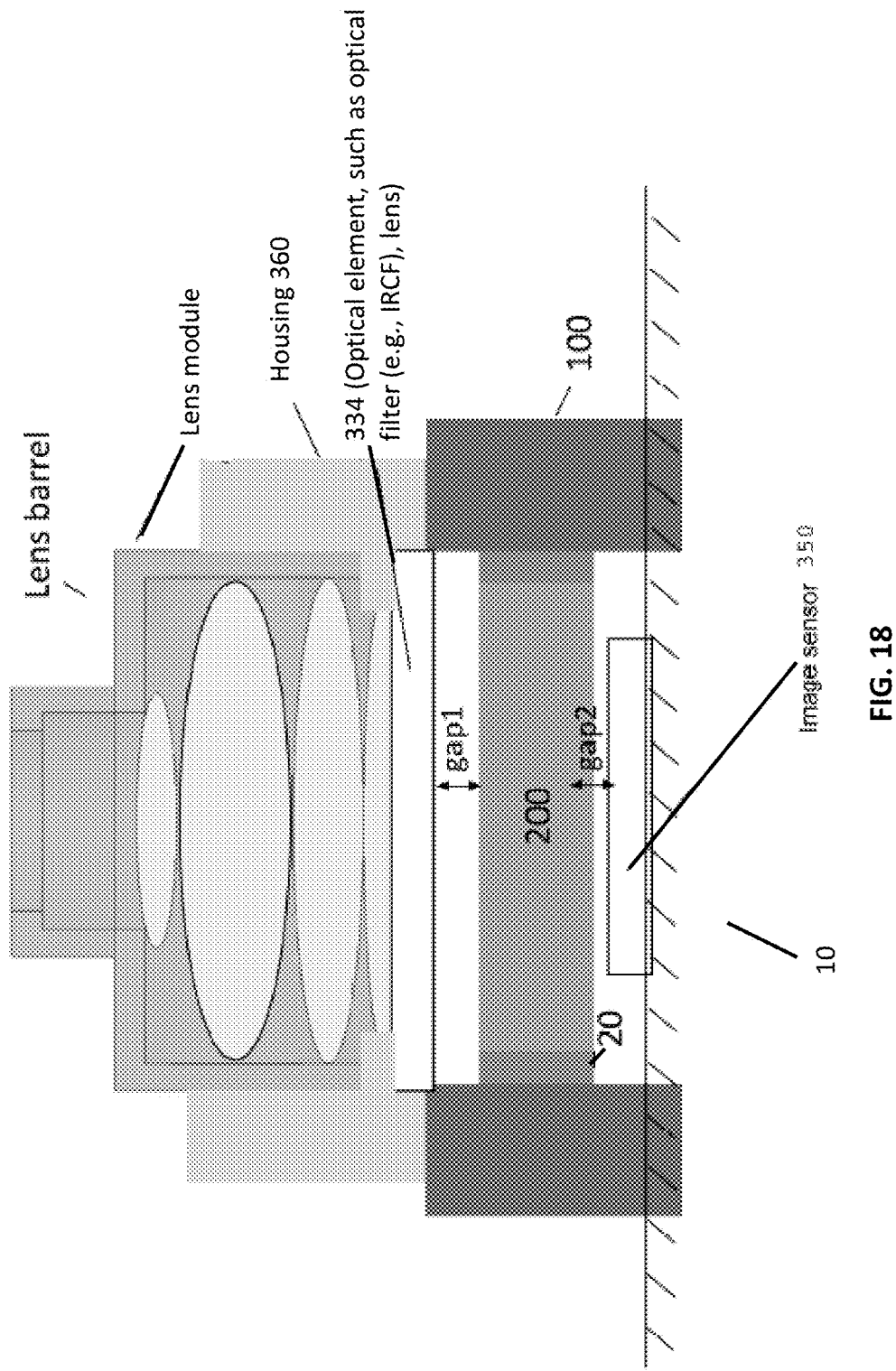
Figure 19:
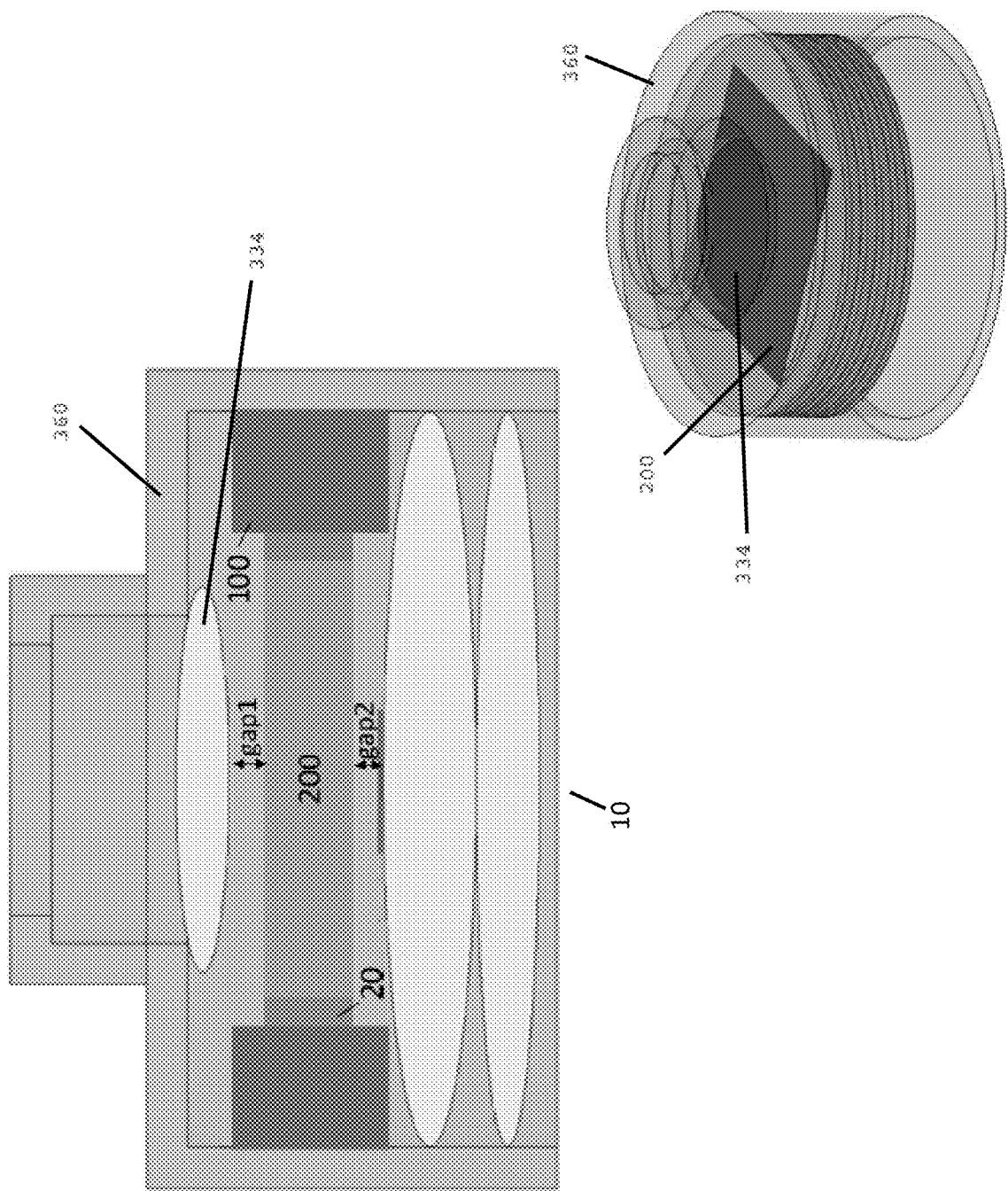
Figure 20:
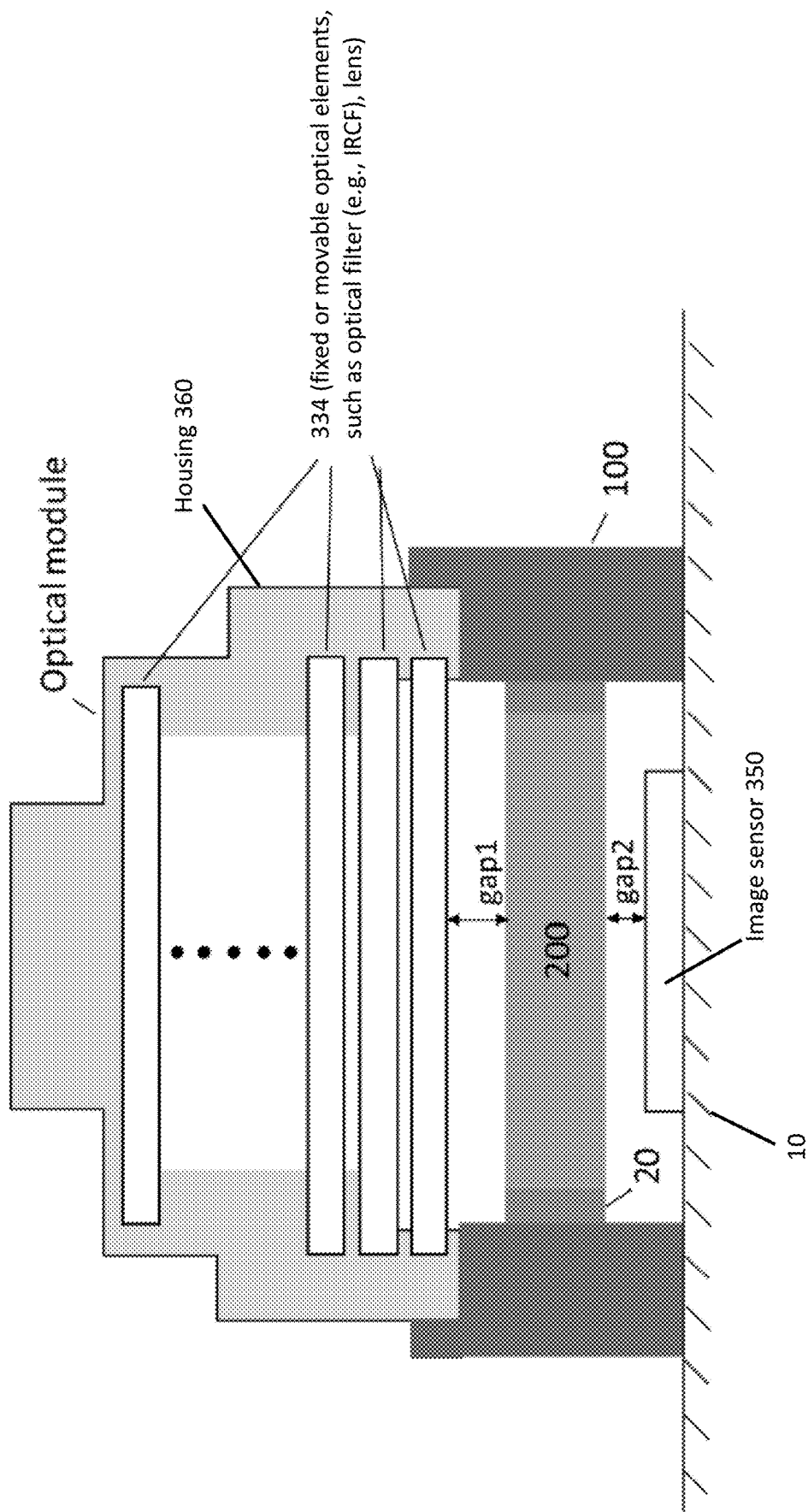
Figure 21:
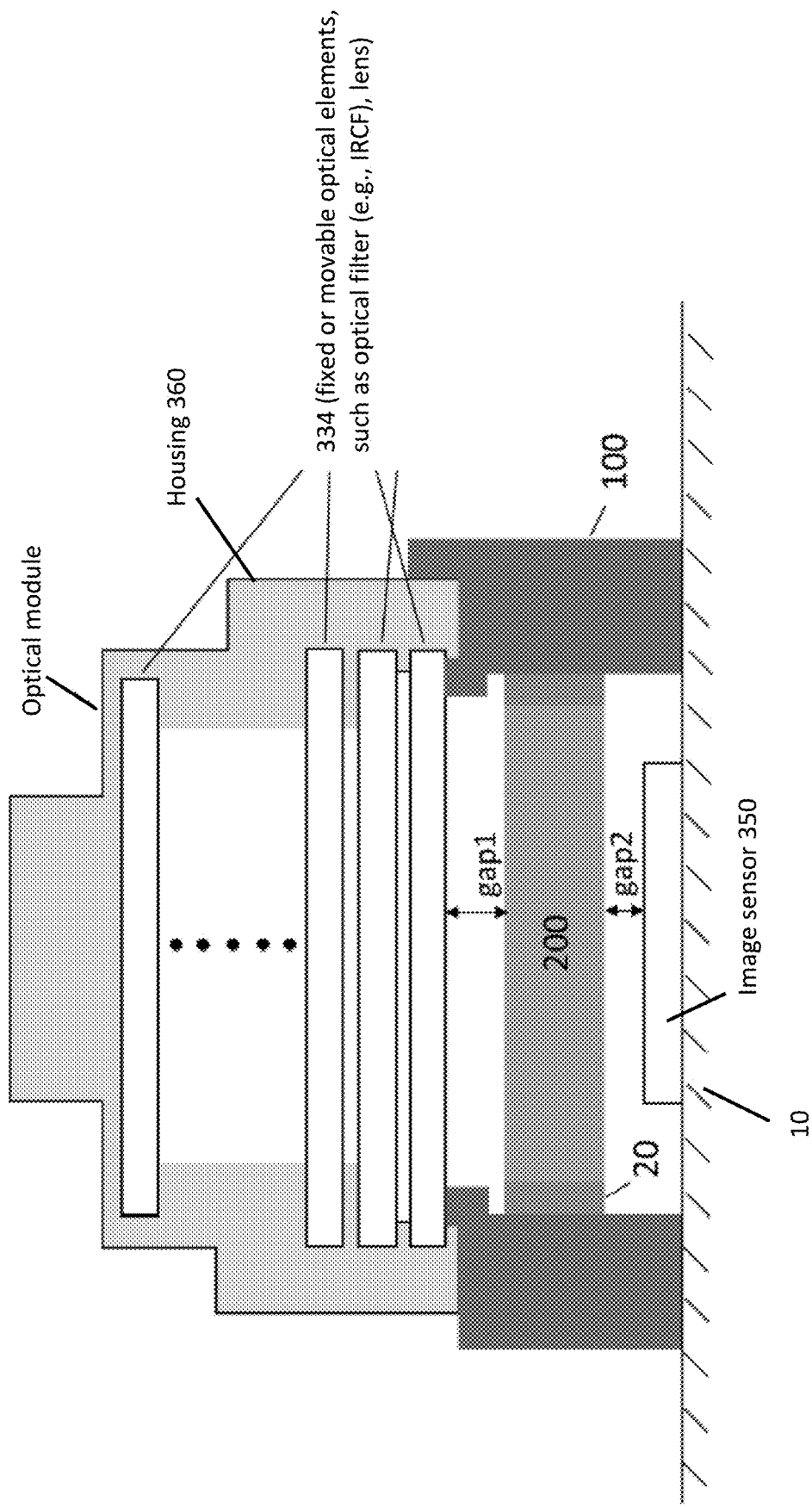

FIG. 15 illustrated a holder 300 that includes an external frame 302, an internal frame 304 (coupled via gel and/or foam 310) to tunable filter 312, and springs 306 that are connected between the frames—for damping mechanical loads. The springs may be formed in the holder by creating cavities. Here the damping requirement could be achieved only by the springs or by a combined actioned of the springs and the gel.

FIGS. 16-21 illustrates opto-mechanical unit 10 that includes tunable filter 200, holder 100 and image sensor 350. Holder 100 is also connected to a housing 360 of the opto-mechanical unit 10.

The tunable filter 200 is positioned between an image sensor 350 of a camera and one or more lenses 334—or between different optical elements of the camera that preceded the image sensor. The tunable filter is mechanically coupled to a mechanically damping element such as, for example, one or more springs, foam and/or a mechanically-damping and gluing gel (20).

It should be noted that in these configurations the holder may include an external (not inner) space for interfacing with components of the camera.

The holder maintains a gap between the tunable filter and any other optical component of the camera.

Figure 22:
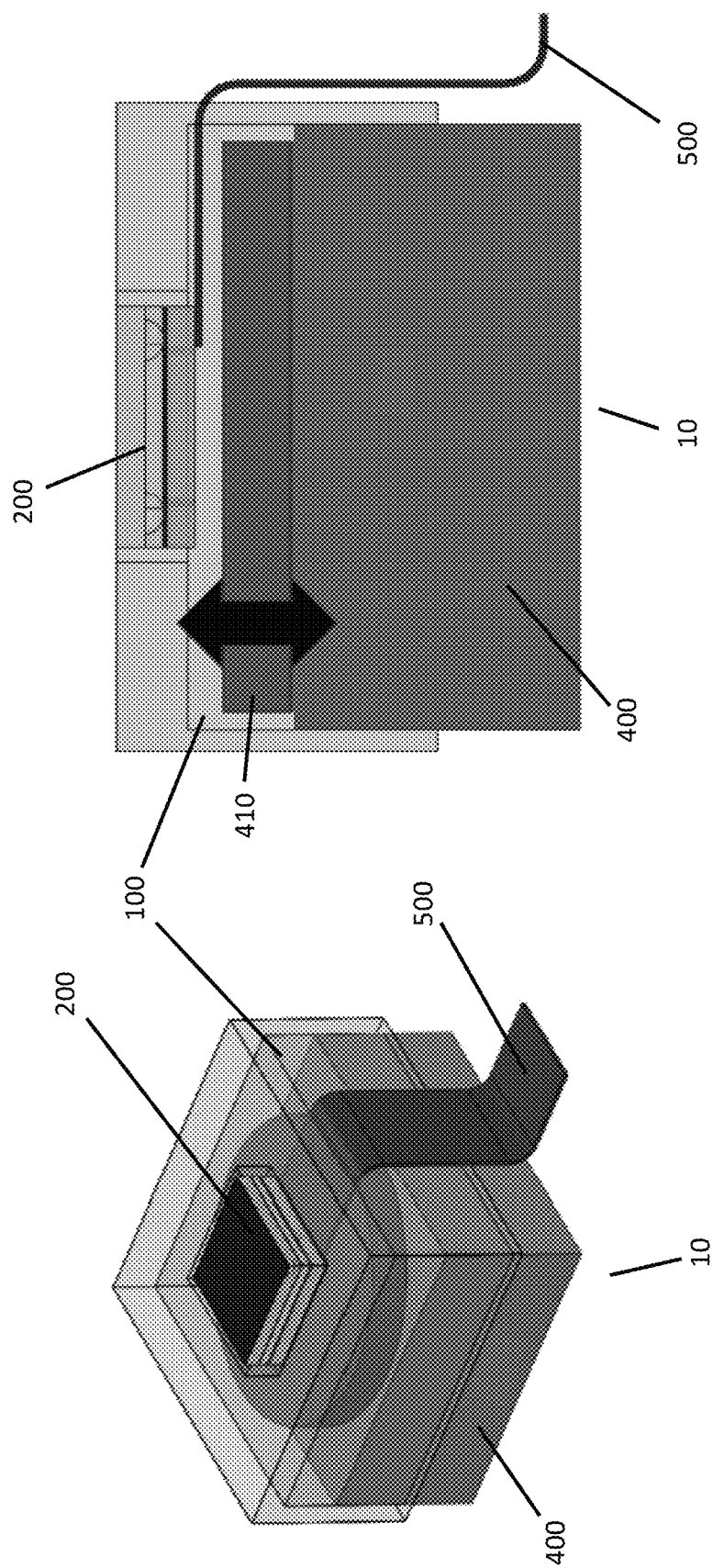

FIG. 22 illustrates an opto-mechanical unit 10 in which the holder 100 is mounted on side walls of the housing of a camera 400, while some portion of the camera module (for example at least some part of 410) is dynamically displaced by an actuation mechanism of the camera (for example, an auto-focus mechanism) such that there exists a relative movement between the components of camera 400. In this example, the flexible connector 500 can be connected to a lower part of the tunable system and does not pass above a horizontal bar of the holder.

Figure 23:
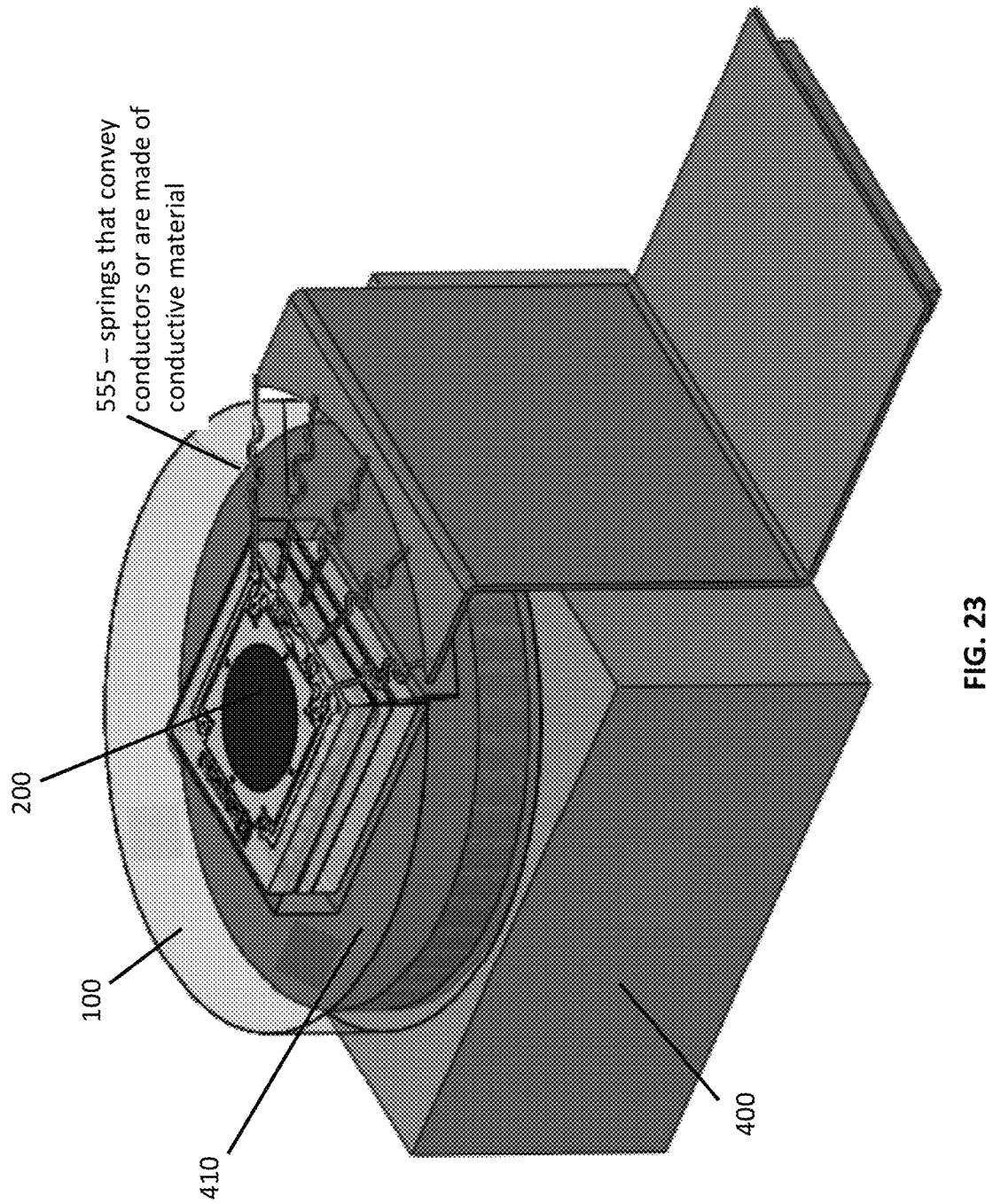

FIG. 23 illustrates an opto-mechanical unit 10 in which the holder 100 is mounted on a dynamically moving part of the camera module (for example at least some part of 410). The moving part is dynamically displaced by an actuation mechanism of the camera (for example, an auto-focus mechanism) such that there exists a relative movement between the moving part the housing of camera 400. In this example, the flexible connector 500 is electrically coupled to the tunable system via springs 555 that are either made of conductive materials of convey conductors.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

All patents and patent applications mentioned in this application are hereby incorporated by reference in their entirety for all purposes set forth herein. It is emphasized that citation or identification of any reference in this application shall not be construed as an admission that such a reference is available or admitted as prior art.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the spectral imager and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "above" may be applied mutatis mutandis to "below".

Any reference to "inner" may be applied mutatis mutandis to "outer".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. An opto-mechanical unit that comprises a tunable filter, a holder that surrounds the tunable filter, and mechanically-damping and gluing gel;
   wherein the tunable filter has multiple sidewalls, a bottom region and a top region; wherein the mechanically-damping and gluing gel is attached to the multiple sidewalls;
   wherein the holder is spaced apart from the tunable filter;
   wherein the mechanically-damping and gluing gel surrounds the tunable filter and is attached to the holder and to the tunable filter; and
   wherein the mechanically-damping and gluing gel prevents any direct contact between the tunable filter and the holder,
   wherein the holder comprises a camera interface that (a) defines a first inner space for receiving a part of a camera, and (b) introduces a gap between the tunable filter and the first inner space.

2. The opto-mechanical unit according to claim 1, wherein the tunable filter has an optical axis that is not obscured by the holder.

3. The opto-mechanical unit according to claim 1, wherein the mechanically- damping and gluing gel is attached to interiors of openings formed within the multiple sidewalls.

4. The opto-mechanical unit according to claim 1, wherein the tunable filter has a pair of opposite sidewalls, a bottom region and a top region; and wherein the mechanically-damping and gluing gel is attached to the pair of opposite sidewalls and does not obscure an optical path that passes through the tunable filter.

5. The opto-mechanical unit according to claim 1, wherein the camera interface comprises a barrier for introducing the gap.

6. The opto- mechanical unit according to claim 1, wherein the tunable filter is positioned within a second inner space defined by the holder; and wherein the first inner space is positioned between the second inner space and the camera; and wherein the second inner space differs by shape from the first inner space.

7. The opto-mechanical unit according to claim 1, comprising conductors that are electrically coupled to the tunable filter; the opto-mechanical unit further comprising a rigid connector, wherein the rigid connector comprises the conductors; and/or a flexible connector, wherein the flexible connector comprises the conductors.

8. The opto-mechanical unit according to claim 1, comprising conductors that are electrically coupled to the tunable filter and a connector that comprises the conductors;

wherein the holder comprises a connector support element that is arranged to support the connector.

9. The opto-mechanical unit according to claim 1, wherein the camera interface comprises an adaptor for bridging between the first inner space and an exterior of the camera.

10. The opto-mechanical unit according to claim 1, comprising the camera; wherein the camera interface comprises an adaptor for bridging between the first inner space and an exterior of the camera.

11. The opto-mechanical unit according to claim 1, wherein the mechanically- damping and gluing gel is a cured mechanically-damping and gluing gel; and wherein the mechanically-damping and gluing gel forms a rectangular frame between the holder and the tunable filter.

12. The opto-mechanical unit according to claim 1, wherein the mechanically-damping and gluing gel and the tunable filter have coefficients of thermal expansion at the same order of magnitude.

13. An opto-mechanical unit that comprises a tunable filter, a holder that surrounds the tunable filter, and one or more mechanically-damping elements for damping mechanical vibrations before reaching the tunable filter; wherein at least one mechanically damping element surrounds the tunable filter, is positioned between the holder and the tunable filter and is attached to at least one of the holder and the tunable filter; wherein the one or more mechanically-damping elements comprises a foam element positioned between the holder and the tunable filter, wherein the foam element enables a relative displacement between the holder and the tunable filter and is operative to damp mechanical vibrations before reaching the tunable filter; wherein the holder is spaced apart from the tunable filter; and wherein the holder comprises a camera interface that (a) defines a first inner space for receiving a part of a camera, and (b) introduces a gap between the tunable filter and the first inner space.

14. The opto-mechanical unit according to claim 13, wherein the one or more mechanically damping elements comprise a foam element that contacts the tunable filter or glued to a gluing gel.

15. The opto-mechanical unit according to claim 13, wherein the one or more mechanically damping elements comprise one or more springs.

16. The opto-mechanical unit according to claim 13, wherein the holder is a mechanically-damping holder.

17. The opto-mechanical unit according to claim 13, wherein the holder and at least one of the one or more mechanically damping elements are a single body made of a same mechanically damping material.

18. The opto-mechanical unit according to claim 13, wherein at least one of the one or more mechanically damping elements is a cured gluing gel.

* * * * *